US011770325B2

(12) United States Patent
Vaughan et al.

(10) Patent No.: US 11,770,325 B2
(45) Date of Patent: *Sep. 26, 2023

(54) AUTOMATICALLY SELECTING AN OPTIMIZED COMMUNICATION CHANNEL FOR COMMUNICATIONS WITH A DEFLECT IN AN OVERLAY NETWORK

(71) Applicant: DISPERSIVE HOLDINGS, INC., Roswell, GA (US)

(72) Inventors: William Vaughan, Cumming, GA (US); Boris Altshul, Alexandria, VA (US); Gustav Larsson, Sunnyvale, CA (US)

(73) Assignee: DISPERSIVE HOLDINGS, INC., Roswell, GA (US)

( * ) Notice: Subject to any disclaimer, the term of this patent is extended or adjusted under 35 U.S.C. 154(b) by 573 days.

This patent is subject to a terminal disclaimer.

(21) Appl. No.: 17/090,986

(22) Filed: Nov. 6, 2020

(65) Prior Publication Data
US 2021/0111987 A1    Apr. 15, 2021

Related U.S. Application Data

(63) Continuation of application No. 16/206,303, filed on Nov. 30, 2018, now Pat. No. 10,833,972.

(51) Int. Cl.
*H04L 45/02* (2022.01)
*H04L 69/165* (2022.01)
*H04L 45/64* (2022.01)

(52) U.S. Cl.
CPC .............. *H04L 45/06* (2013.01); *H04L 45/64* (2013.01); *H04L 69/165* (2013.01)

(58) Field of Classification Search
None
See application file for complete search history.

(56) References Cited

U.S. PATENT DOCUMENTS

| | | | |
|---|---|---|---|
| 7,412,224 B2 * | 8/2008 | Kotola | H04L 67/55 725/62 |
| 8,396,954 B2 * | 3/2013 | Nagaraj | H04L 41/50 709/227 |

(Continued)

*Primary Examiner* — Faiyazkhan Ghafoerkhan
(74) *Attorney, Agent, or Firm* — Morris, Manning & Martin LLP; Adam J. Thompson, Esq.

(57) ABSTRACT

In accordance with one or more preferred implementations, an overlay network in the form of a dispersive virtual network is implemented utilizing data deflects to implement and facilitate routing in a data plane and call processing deflects to implement and facilitate routing in a control plane. Various nodes in the dispersive virtual network, such as end devices running dispersive virtual networking client software, establish communication channels to these deflects running dispersive virtual networking protocols transported by user datagram protocol (UDP) frames, transmission control protocol (TCP) streams, and hypertext transfer protocol (HTTP) streams. In accordance with one or more preferred implementations, software allows nodes in a dispersive virtual network to automatically detect the channel types that are available at the time the node must initiate a new session, and automatically configure the most efficient communication channel without requiring input from an end user or from a network administrator.

17 Claims, 17 Drawing Sheets

(56) References Cited

U.S. PATENT DOCUMENTS

| | | | | | |
|---|---|---|---|---|---|
| 8,825,829 | B2* | 9/2014 | Gupta | ..................... | H04L 41/50 709/227 |
| 9,918,242 | B2* | 3/2018 | Radunovic | ............ | H04W 16/10 |
| 10,601,886 | B2* | 3/2020 | Lohmar | ............. | H04N 21/8456 |
| 10,833,972 | B2* | 11/2020 | Vaughan | ............... | H04L 69/165 |
| 11,038,941 | B2* | 6/2021 | Lohmar | ............. | H04N 21/8456 |
| 11,153,118 | B2* | 10/2021 | Giovanni | ............ | H04L 12/2898 |
| 11,265,092 | B2* | 3/2022 | Wang | .................. | H04B 17/318 |
| 11,342,065 | B2* | 5/2022 | Vincent | .................. | G16H 30/40 |
| 11,391,830 | B2* | 7/2022 | Au | ........................ | H04W 48/16 |
| 2006/0212531 | A1* | 9/2006 | Kikkawa | ............... | H04L 65/611 709/217 |
| 2006/0242664 | A1* | 10/2006 | Kikkawa | ................ | H04L 67/02 725/37 |
| 2007/0110010 | A1* | 5/2007 | Kotola | .................... | H04W 4/80 370/338 |
| 2009/0199239 | A1* | 8/2009 | Chaki | .................. | H04N 21/472 725/39 |
| 2011/0246673 | A1* | 10/2011 | Kishore | .................. | H04L 65/70 709/247 |
| 2012/0166584 | A1* | 6/2012 | Kwon | ..................... | H04L 67/55 709/217 |
| 2012/0179796 | A1* | 7/2012 | Nagaraj | .................. | H04L 41/50 709/223 |
| 2013/0254365 | A1* | 9/2013 | Gupta | ..................... | H04L 45/22 709/223 |
| 2015/0222451 | A1* | 8/2015 | Kwon | ..................... | H04L 67/12 709/225 |
| 2015/0262241 | A1* | 9/2015 | Shuster | .................. | H04L 63/18 709/204 |
| 2015/0281174 | A1* | 10/2015 | Hwang | ............... | H04L 61/4511 709/244 |
| 2017/0055179 | A1* | 2/2017 | Radunovic | ............ | H04L 5/0096 |
| 2020/0177492 | A1* | 6/2020 | Vaughan | ............... | H04L 69/16 |
| 2020/0266905 | A1* | 8/2020 | Wang | ..................... | H04L 43/10 |
| 2021/0111987 | A1* | 4/2021 | Vaughan | ............... | H04L 45/306 |

* cited by examiner

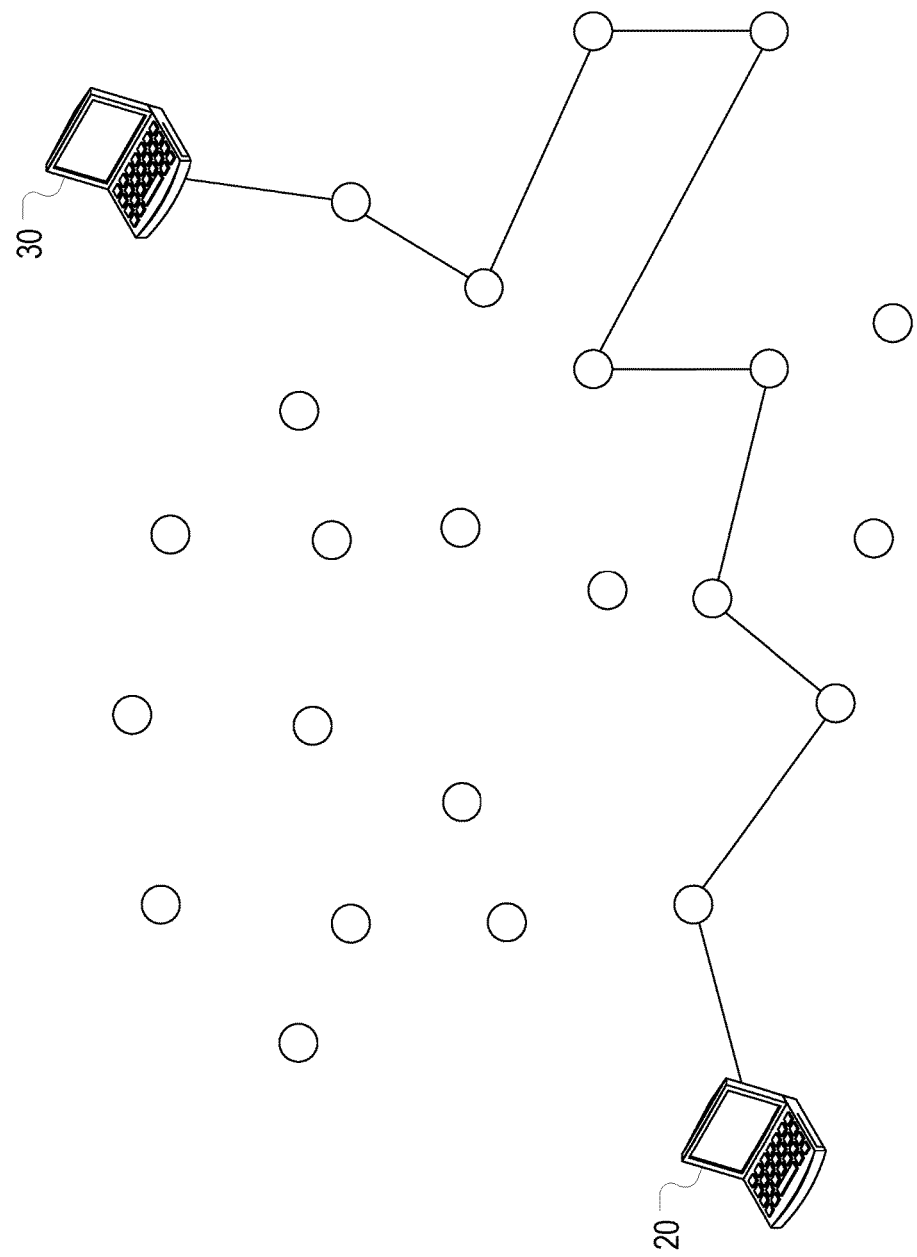

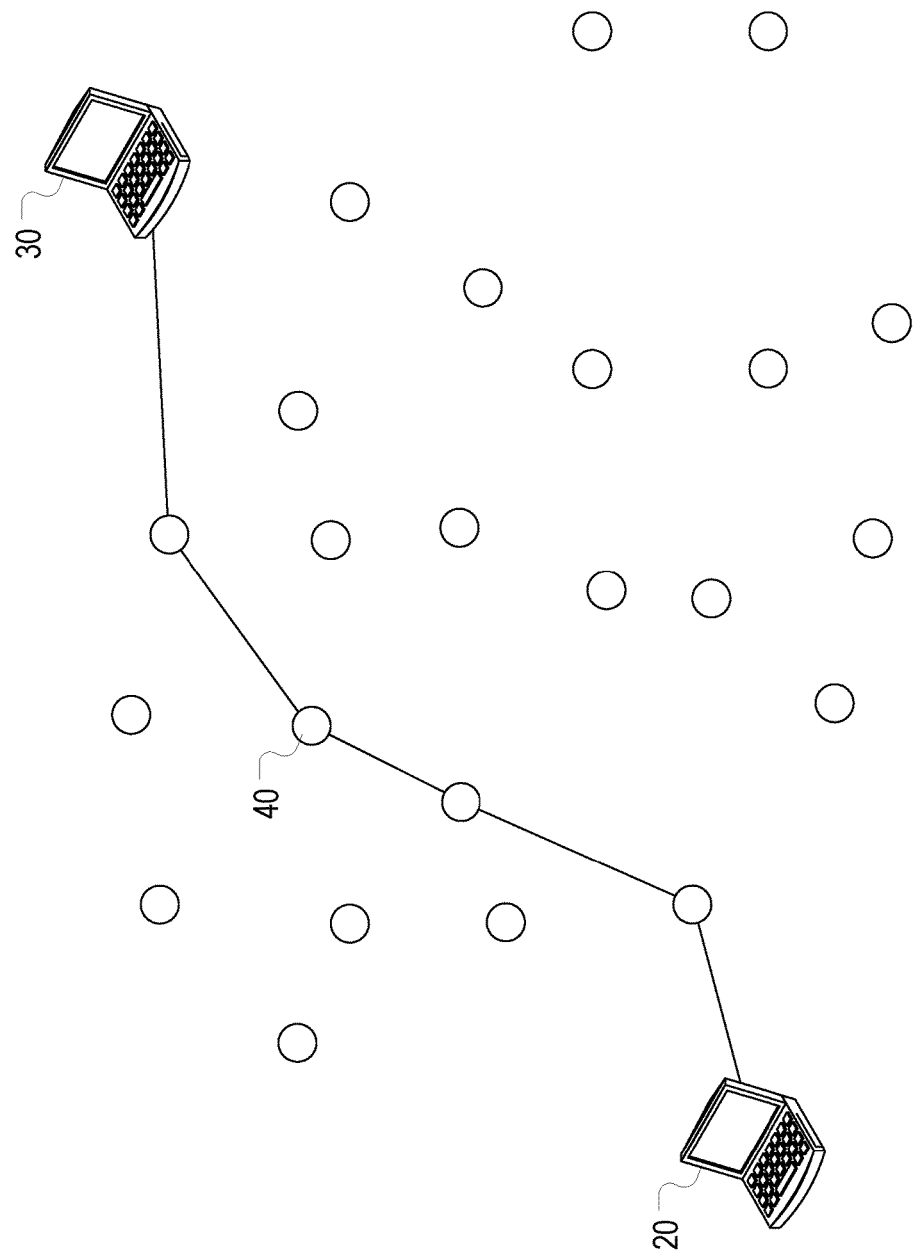

| State | Description |
|---|---|
| UDP-ATTEMPT | Attempting establish UDP Ping messages with CALL-P |
| UDP-EST | Peered to CALL-P over UDP using PING exchange |
| TCP-ATTEMPT | Sent TCP Connect to CALL-P |
| TCP-CONNECTED | TCP Connection to CALL-P is accepted on TCP level |
| TCP-EST | Peered to CALL-P over TCP using PING exchange |
| TCP-EST-UDP-TRY | Attempt to connect to CALL-P over UDP while still TCP-connected |
| HTTP-ATTEMPT | Sent TCP connect to CALL-P |
| HTTP-CONNECTED | Got TCP ACK from remote CALL-P |
| HTTP-EST | Peered to CALL-P over HTTP using PING exchange |
| HTTP-EST-UDP-TRY | Attempt to connect to CALL-P over UDP while still HTTP-connected |
| HTTP-EXR-TCP-TRY | Attempt to connect to CALL-P over Plain TCP while still HTTP-connected |

*FIG. 14*

AUTOMATICALLY SELECTING AN OPTIMIZED COMMUNICATION CHANNEL FOR COMMUNICATIONS WITH A DEFLECT IN AN OVERLAY NETWORK

CROSS-REFERENCE TO RELATED APPLICATIONS

The present application is a U.S. continuation patent application of, and claims priority under 35 U.S.C. § 120 to, U.S. patent application Ser. No. 16/206,303, filed Nov. 30, 2018, which '303 application and any patent issuing therefrom are hereby incorporated herein by reference. The present application hereby incorporates herein by reference the entire disclosure of U.S. Pat. No. 9,071,607, titled "Virtual Dispersive Networking Systems and Methods", which issued on Jun. 30, 2015.

COPYRIGHT STATEMENT

Any new and original work of authorship in this document—including any source code—is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The present invention generally relates to network routing and network communications.

Conventional networks, such as the Internet, rely heavily on centralized routers to perform routing tasks in accomplishing network communications, and end devices have relatively little control over a network path utilized for such network communications.

However, approaches have been proposed which give end devices some level of control over network routing. For example, U.S. Pat. No. 9,071,607 discloses an approach which involves intentionally "deflecting" network traffic through one or more intermediate nodes or devices.

FIG. 1 illustrates conventional routing of a packet from an originating end device 20 to a terminating end device 30 through intermediate nodes of a network. Another node, such as node 40, can be used as a deflect by forcing a packet to be routed therethrough. For example, this can be accomplished by an originating end device 20 sending a packet to the node 40, as illustrated in FIG. 2A, and the node 40 receiving and forwarding the packet along to a terminating end device 30, as illustrated in FIG. 2B. In this way, the node 40 acts as a deflect node or device which impacts the network path a packet takes through the network, as illustrated in FIG. 2C.

As the '607 patent discusses, although complete control of routing with respect to nodes a message or packet will pass through may not be available, by choosing to utilize one or more deflects, multiple paths can be selected and utilized. Thus, different messages could be sent over different network paths, or different parts of a message could be sent all at once over different network paths, or a network path could be changed over time, or in response to a failed connection.

The '607 patent discloses the use of a control server, or orchestrator, to establish, monitor, and control connections, or communication channels. The '607 patent discloses that client software installed at end devices can communicate their internet protocol (IP) address to a control server which stores it in association with a unique identifier for the end device or a user. The client software at an end device can periodically check in with the control server to maintain up to date IP address information for the user or end device at the control server.

Then, when two end devices or users desire to communicate with one another, the control server can determine that the end devices or users are authorized to communicate with one another, and communicate connection information to the software clients at the end devices to facilitate a connection. Generally, the control server is not involved in this connection, and does not form part of the network path for network communications between the end devices.

In addition to communicating connection information to the software clients at end devices to facilitate connections, a control server can also communicate control information to deflects. The control server and communications used to establish, monitor, and control connections, or communication channels, can be characterized as being associated with a control plane, while data deflects and communication of data between end nodes, e.g. over established connections or communication channels, can be characterized as being associated with a data plane. This architecture and methodology can be characterized a setting up an overlay network in which the control plane is utilized to set up network communications via the data plane which occur over pre-existing network infrastructure representing one or more underlying networks.

However, needs continue to exist for improvement in network routing. These and other needs are addressed by one or more aspects of the present invention.

SUMMARY OF THE INVENTION

The present invention includes many aspects and features. Moreover, while many aspects and features relate to, and are described in, a particular context, the present invention is not limited to use only in this context, as will become apparent from the following summaries and detailed descriptions of aspects, features, and one or more embodiments of the present invention.

Accordingly, one aspect of the present invention relates to a system for facilitating network communications utilizing an overlay network in which nodes are configured to automatically select an optimized communication channel. The system includes a plurality of end devices having overlay client software loaded thereon configured to facilitate network communications between the end devices over the overlay network, a plurality of data deflects having overlay software loaded thereon configured to route communications between end devices through the overlay network, a control server configured to set up network communications between the plurality of end devices, the control server being configured to maintain a listing for each end device that associates a unique identifier of the end device with an IP address of the end device, and a plurality of call processing deflects having overlay software loaded thereon configured to route control communications between the control server and other nodes in the overlay network over the overlay network. The overlay software loaded on each data deflect is configured to support user datagram protocol (UDP) connections and transmissions control protocol (TCP) connections, and is configured to support UDP communication channels, TCP communication channels, and communication channels involving HTTP wrapping over a TCP connection. The overlay client software loaded on each end device is configured to establish a communication channel with the call processing deflects of the overlay network utilizing a first process for automatically selecting a UDP, TCP, or HTTP communication channel for communications with a call processing deflect comprising attempting to establish a UDP communication channel with one of the call processing deflects by communicating one or more UDP ping messages from the respective end device to the one of the call processing deflects, and determining whether a response is received to the one or more UDP ping messages or a timeout event occurs. The first process further includes, if the attempt to establish a UDP communication channel with the one of the call processing deflects is unsuccessful, attempting to establish a TCP communication channel with the one of the call processing deflects by attempting to establish a first TCP connection with the one of the call processing deflects by communicating a first TCP connection request from the respective end device to the one of the call processing deflects, and determining whether a TCP acknowledgment is received from the one of the call processing deflects in response to the to the first TCP connection request or a timeout event occurs, and if the first TCP connection is accepted by the one of the call processing deflects, attempting to establish the TCP communication channel by communicating one or more ping messages from the respective end device to the one of the call processing deflects over the first TCP connection, and determining whether a response is received to the one or more ping messages communicated over the first TCP connection or a timeout event occurs. The first process further includes, if the attempt to establish a TCP communication channel with the one of the call processing deflects is unsuccessful, attempting to establish a HTTP encapsulated communication channel with the one of the call processing deflects by attempting to establish a second TCP connection with the one of the call processing deflects by communicating a second TCP connection request from the respective end device to the one of the call processing deflects, and determining whether a TCP acknowledgment is received from the one of the call processing deflects in response to the to the second TCP connection request or a timeout event occurs, and if the second TCP connection is accepted by the one of the call processing deflects, attempting to establish the HTTP encapsulated communication channel by communicating one or more ping messages from the respective end device to the one of the call processing deflects over the second TCP connection utilizing HTTP wrapping, and determining whether a response is received to the one or more ping messages communicated over the second TCP connection utilizing HTTP wrapping or a timeout event occurs. The control server is configured to provide connection information for establishing a connection between two of the end devices by communicating control information to the two end devices via one or more of the call processing deflects, including via one or more communication channels configured via the process for automatically selecting a UDP, TCP, or HTTP communication channel for communications with a call processing deflect. The overlay client software loaded on each end device is configured to establish a communication channel with the data deflects of the overlay network utilizing a second process for automatically selecting a UDP, TCP, or HTTP communication channel for communications with a data deflect comprising evaluating the quality of UDP traffic to the Internet by comparing one or more metrics assessing the quality of UDP traffic to the Internet with one or more threshold values, and based thereon, either selecting a UDP communication channel, or determining that the quality of UDP traffic to the Internet is not of sufficient quality to warrant selection of a UDP communication channel. The second process further includes, if it is determined that the quality of UDP traffic to the Internet is not of sufficient quality to warrant selection of a UDP communication channel, evaluating the quality of TCP traffic to the Internet by comparing one or more metrics assessing the quality of TCP traffic to the Internet with one or more threshold values, and based thereon, either selecting a TCP communication channel, or determining that the quality of TCP traffic to the Internet is not of sufficient quality to warrant selection of a TCP communication channel. The second process further includes, if it is determined that the quality of TCP traffic to the Internet is not of sufficient quality to warrant selection of a TCP communication channel, evaluating the quality of HTTP traffic to the Internet by comparing one or more metrics assessing the quality of HTTP traffic to the Internet with one or more threshold values, and based thereon, either selecting a HTTP communication channel, or determining that the quality of HTTP traffic to the Internet is not of sufficient quality to warrant selection of a HTTP communication channel. The overlay client software loaded on each end device is configured to establish, as part of establishing a connection with another end device over a network path including one or more of the data deflects based on control information received from the control server, a communication channel with a data deflect utilizing the process for automatically selecting a UDP, TCP, or HTTP communication channel for communications with a data deflect.

In a feature of this aspect, the control server comprises one or more physical servers.

In a feature of this aspect, one of the end devices is a phone.

In a feature of this aspect, one of the end devices is a tablet.

In a feature of this aspect, one of the end devices is a mobile electronic device.

In a feature of this aspect, one of the end devices is a tablet.

In a feature of this aspect, one of the end devices comprises a virtual machine.

In a feature of this aspect, one of the end devices comprises a container.

In a feature of this aspect, one of the end devices is a desktop computer.

In a feature of this aspect, one of the end devices is a laptop computer.

Another aspect relates to a method for network communications utilizing an overlay network in which nodes are configured to automatically select an optimized communication channel. The method includes establishing, by overlay client software loaded on an end device, a communication channel with a call processing deflect of the overlay network utilizing a first process for automatically selecting a UDP, TCP, or HTTP communication channel comprising attempting to establish a UDP communication channel with the call processing deflect by communicating one or more UDP ping messages from the respective end device to the call processing deflect, and determining whether a response is received to the one or more UDP ping messages or a timeout event occurs. The first process further includes, if the attempt to establish a UDP communication channel with the call processing deflect is unsuccessful, attempting to establish a TCP communication channel with the call processing deflect by attempting to establish a first TCP connection with the call processing deflect by communicating a first TCP connection request from the respective end device to the call processing deflect, and determining whether a TCP acknowledgment is received from the call processing deflect in response to the to the first TCP connection request or a timeout event occurs, and if the first TCP connection is accepted by the call processing deflect, attempting to establish the TCP communication channel by communicating one or more ping messages from the respective end device to the call processing deflect over the first TCP connection, and determining whether a response is received to the one or more ping messages communicated over the first TCP connection or a timeout event occurs. The first process further includes, if the attempt to establish a TCP communication channel with the call processing deflect is unsuccessful, attempting to establish a HTTP encapsulated communication channel with the call processing deflect by attempting to establish a second TCP connection with the call processing deflect by communicating a second TCP connection request from the respective end device to the call processing deflect, and determining whether a TCP acknowledgment is received from the call processing deflect in response to the to the second TCP connection request or a timeout event occurs, and if the second TCP connection is accepted by the call processing deflect, attempting to establish the HTTP encapsulated communication channel by communicating one or more ping messages from the respective end device to the call processing deflect over the second TCP connection utilizing HTTP wrapping, and determining whether a response is received to the one or more ping messages communicated over the second TCP connection utilizing HTTP wrapping or a timeout event occurs. The method further includes providing, by a control server of the overlay network, connection information for establishing a connection between the end device and another end device by communicating control information to the two end devices via one or more of the call processing deflects, including via the established communication channel between the end device and the call processing deflect. The method further includes establishing, by the overlay client software loaded on the end device, a communication channel with a data deflect of the overlay network utilizing a second process for automatically selecting a UDP, TCP, or HTTP communication channel for communications with a data deflect comprising evaluating the quality of UDP traffic to the Internet by comparing one or more metrics assessing the quality of UDP traffic to the Internet with one or more threshold values, and based thereon, either selecting a UDP communication channel, or determining that the quality of UDP traffic to the Internet is not of sufficient quality to warrant selection of a UDP communication channel. The second process further includes, if it is determined that the quality of UDP traffic to the Internet is not of sufficient quality to warrant selection of a UDP communication channel, evaluating the quality of TCP traffic to the Internet by comparing one or more metrics assessing the quality of TCP traffic to the Internet with one or more threshold values, and based thereon, either selecting a TCP communication channel, or determining that the quality of TCP traffic to the Internet is not of sufficient quality to warrant selection of a TCP communication channel. The second process further includes, if it is determined that the quality of TCP traffic to the Internet is not of sufficient quality to warrant selection of a TCP communication channel, evaluating the quality of HTTP traffic to the Internet by comparing one or more metrics assessing the quality of HTTP traffic to the Internet with one or more threshold values, and based thereon, either selecting a HTTP communication channel, or determining that the quality of HTTP traffic to the Internet is not of sufficient quality to warrant selection of a HTTP communication channel. The method further includes communicating data from the end device to the other end device over a network path through the overlay network that includes the data deflect, such communicating data comprising communicating data utilizing the communication channel established by the end device with the data deflect.

Another aspect relates to a method for network communications utilizing an overlay network in which nodes are configured to automatically select an optimized communication channel. The method includes establishing, by overlay client software loaded on an end device, a communication channel with a call processing deflect of the overlay network utilizing a first process for automatically selecting a communication channel, the first process for automatically selecting a communication channel being utilized and configured based on a device type of the end device; providing, by a control server of the overlay network, connection information for establishing a connection between the end device and another end device by communicating control information to the two end devices via one or more of the call processing deflects, including via the established communication channel between the end device and the call processing deflect; establishing, by the overlay client software loaded on the end device, a communication channel with a data deflect of the overlay network utilizing a second process for automatically selecting a communication channel for communications with a data deflect, the second process for automatically selecting a communication channel being utilized and configured based on a device type of the end device; and communicating data from the end device to the other end device over a network path through the overlay network that includes the data deflect, such communicating data comprising communicating data utilizing the communication channel established by the end device with the data deflect.

In feature of this aspect, the first process comprises prioritizing a TCP connection.

In feature of this aspect, the end device comprises a mobile communication device.

In feature of this aspect, the end device comprises an iOS device.

In feature of this aspect, the end device comprises an iOS device, and the first process comprises prioritizing a TCP connection.

In feature of this aspect, the end device comprises an iOS device, the first process comprises prioritizing a TCP connection, and the second process comprises prioritizing a TCP connection.

In feature of this aspect, the communication channel established by the end device with the data deflect comprises a first HTTP communication channel, and wherein the method further comprises Another aspect relates to a method for network communications utilizing an overlay network in which nodes are configured to automatically select an optimized communication channel. The method includes establishing, by overlay client software loaded on an end device, a communication channel with a call processing deflect of the overlay network utilizing a first process for automatically selecting a communication channel; and providing, by a control server of the overlay network, connection information for establishing a connection between the end device and another end device by communicating control information to the two end devices via one or more of the call processing deflects, including via the established communication channel between the end device and the call processing deflect. The method further includes establishing, by the overlay client software loaded on the end device, one or more communication channels with a data deflect of the overlay network utilizing a second process for automatically selecting a communication channel for communications with a data deflect. Such establishing includes creating, by the overlay client software loaded on the end device, a first HTTP GET channel to receive traffic at the end device, and associating the first HTTP GET channel as a current HTTP GET channel, creating, by the overlay client software loaded on the end device, a first HTTP POST channel to send traffic from the end device, and associating the first HTTP POST channel as a current HTTP POST channel, creating, by the overlay client software loaded on the end device, a second HTTP GET channel to receive traffic at the end device, and associating the second HTTP GET channel as a next HTTP GET channel, and creating, by the overlay client software loaded on the end device, a second HTTP POST channel to send traffic from the end device, and associating the second HTTP POST channel as a next HTTP POST channel. The method further includes communicating data from the end device to the other end device over a network path through the overlay network that includes the data deflect, such communicating data comprising receiving data at the end device over the first HTTP GET channel which is associated as the current HTTP GET channel, and sending data from the end device over the first HTTP POST channel which is associated as the current HTTP POST channel. The method further includes determining, at the end device, that a Content-Length has been reached on the first HTTP GET channel, and, based thereon, determining, by the overlay client software loaded on the end device, that the second HTTP GET channel is associated as the next HTTP GET channel, and changing the association such that it is associated as the current HTTP GET channel, and creating, by the overlay client software loaded on the end device, a third HTTP GET channel to receive traffic at the end device, and associating the third HTTP GET channel as the next HTTP GET channel. The method further includes communicating data from the end device to the other end device over a network path through the overlay network that includes the data deflect, such communicating data comprising receiving data at the end device over the second HTTP GET channel which is associated as the current HTTP GET channel, and sending data from the end device over the first HTTP POST channel which is associated as the current HTTP POST channel. The method further includes determining, at the end device, that a Content-Length has been reached on the first HTTP POST channel, and, based thereon, determining, by the overlay client software loaded on the end device, that the second HTTP POST channel is associated as the next HTTP POST channel, and changing the association such that it is associated as the current HTTP POST channel, and creating, by the overlay client software loaded on the end device, a third HTTP POST channel to receive traffic at the end device, and associating the third HTTP POST channel as the next HTTP POST channel. The method further includes communicating data from the end device to the other end device over a network path through the overlay network that includes the data deflect, such communicating data comprising receiving data at the end device over the second HTTP GET channel which is associated as the current HTTP GET channel, and sending data from the end device over the second HTTP POST channel which is associated as the current HTTP POST channel.

Another aspect relates to a method for network communications utilizing an overlay network in which nodes are configured to automatically select an optimized communication channel. The method includes establishing, by overlay client software loaded on an end device, a communication channel with a call processing deflect of the overlay network utilizing a first process for automatically selecting a communication channel; and providing, by a control server of the overlay network, connection information for establishing a connection between the end device and another end device by communicating control information to the two end devices via one or more of the call processing deflects, including via the established communication channel between the end device and the call processing deflect. The method further includes establishing, by the overlay client software loaded on the end device, one or more communication channels with a data deflect of the overlay network utilizing a second process for automatically selecting a communication channel for communications with a data deflect. Such establishing includes creating, by the overlay client software loaded on the end device, a current HTTP GET channel, creating, by the overlay client software loaded on the end device, a current HTTP POST channel, creating, by the overlay client software loaded on the end device, a next HTTP GET channel, and creating, by the overlay client software loaded on the end device, a next HTTP POST channel. The method further includes communicating data from the end device to the other end device over a network path through the overlay network that includes the data deflect, such communicating data comprising receiving data at the end device over the current HTTP GET channel, and sending data from the end device over the current HTTP POST channel. The method involves, during the communicating of data from the end device to the other end device, repeatedly determining, at the end device, that a Content-Length has been reached on the current HTTP GET channel, and, based thereon, converting the next HTTP GET channel to be the current HTTP GET channel, and creating, by the overlay client software loaded on the end device, a new HTTP GET channel to be the next HTTP GET channel, and determining, at the end device, that a Content-Length has been reached on the current HTTP POST channel, and, based thereon, converting the next HTTP POST channel to be the current HTTP POST channel, and creating, by the overlay client software loaded on the end device, a new HTTP POST channel to be the next HTTP POST channel.

Another aspect relates to software for implementing a disclosed method.

Another aspect relates to a non-transitory computer readable medium containing computer executable instructions for performing a disclosed method.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

FIG. 1 illustrates conventional routing of a packet from an originating end device 20 to a terminating end device 30 through intermediate nodes of a network.

FIGS. 2A-C illustrate routing of a packet through a deflect.

FIG. 14 illustrates exemplary major states of CallP processing in accordance with one or more preferred implementations.

DETAILED DESCRIPTION

Figure 2A:
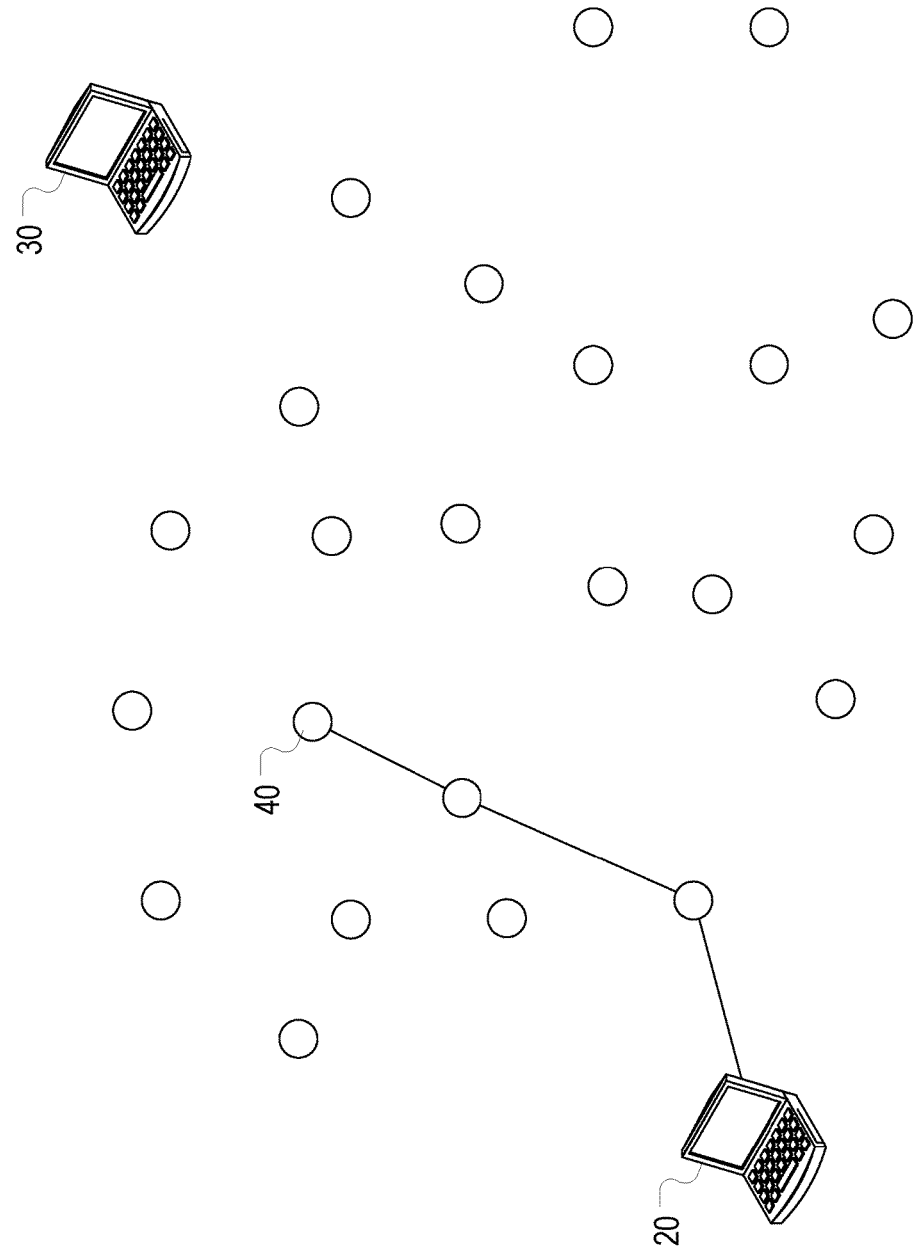
Figure 2B:
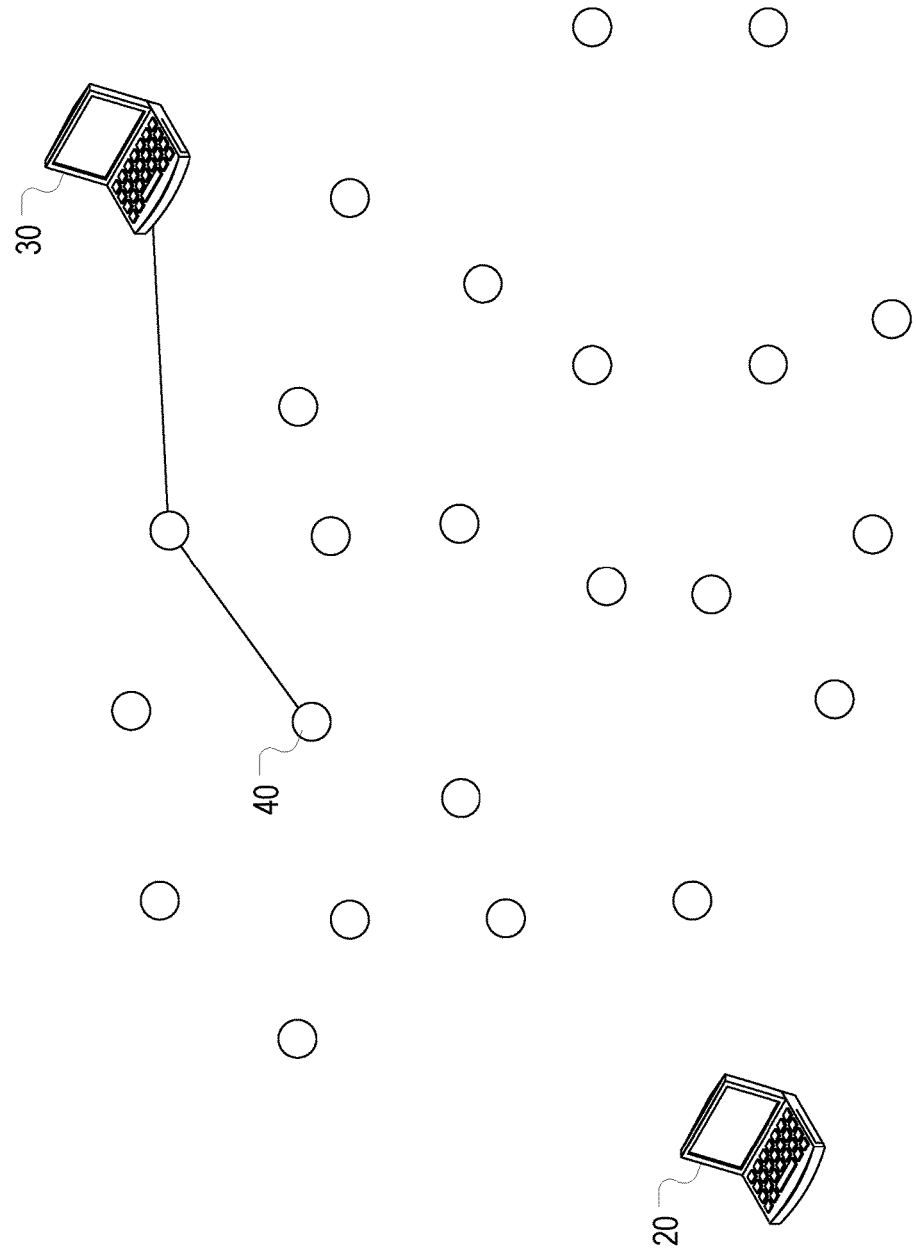

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

As discussed above, approaches are known which give end devices some level of control over network routing by intentionally deflecting network traffic through one or more intermediate nodes or devices, which can be characterized as deflects.

An exemplary implementation involving deflects will now be described.

This exemplary implementation involves a plurality of data deflects which are available for use in intentionally deflecting network traffic therethrough to provide at least some control over network routing.

This exemplary implementation further involves a control server, or centralized orchestrator, which facilitates setting up network paths through these data deflects. The control server and communications used to establish, monitor, and control connections, or communication channels, can be characterized as being associated with a control plane, while data deflects and communication of data between end nodes, e.g. over established connections or communication channels, can be characterized as being associated with a data plane. This architecture and methodology can be characterized a setting up an overlay network in which the control plane is utilized to set up network communications via the data plane which occur over preexisting network infrastructure representing one or more underlying networks. In accordance with one or more preferred implementations, such an overlay network can be characterized as a dispersive virtual network (DVN).

In addition to data deflects which are used to facilitate communications of data over the data plane, one or more deflects can be utilized to facilitate control communications over the control plane. These deflects can be characterized as call processing deflects, or CallP deflects.

Figure 3:
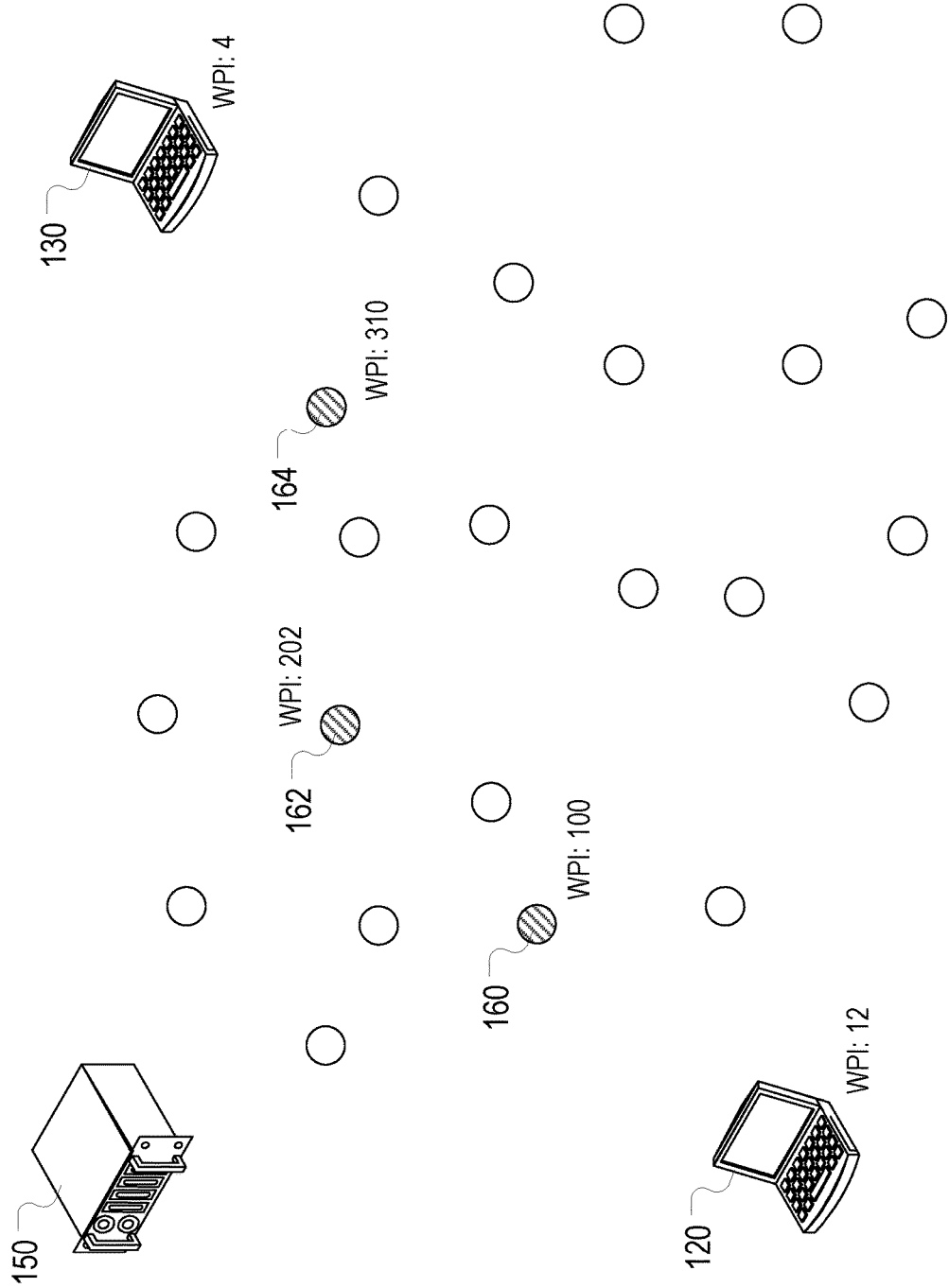
FIG. 3 illustrates an exemplary network in which a first end device which wants to communicate with a second end device.

For purposes of an example, consider a situation involving a first end device 120 which wants to communicate with a second end device 130, as illustrated in FIG. 3.

Each device has a unique identifier, which might be characterized as a waypoint identifier (WPI), that is associated therewith at an orchestrator 150. The first end device 120 has a waypoint identifier of 12, while the second end device 130 has a waypoint identifier of 4.

One or more data deflects may also have unique identifiers, e.g. in the form of waypoint identifiers. These might include a data deflect 160 having a waypoint identifier of 100, a data deflect 162 having a waypoint identifier of 202, and a data deflect 164 having a waypoint identifier of 310.

Figure 4:
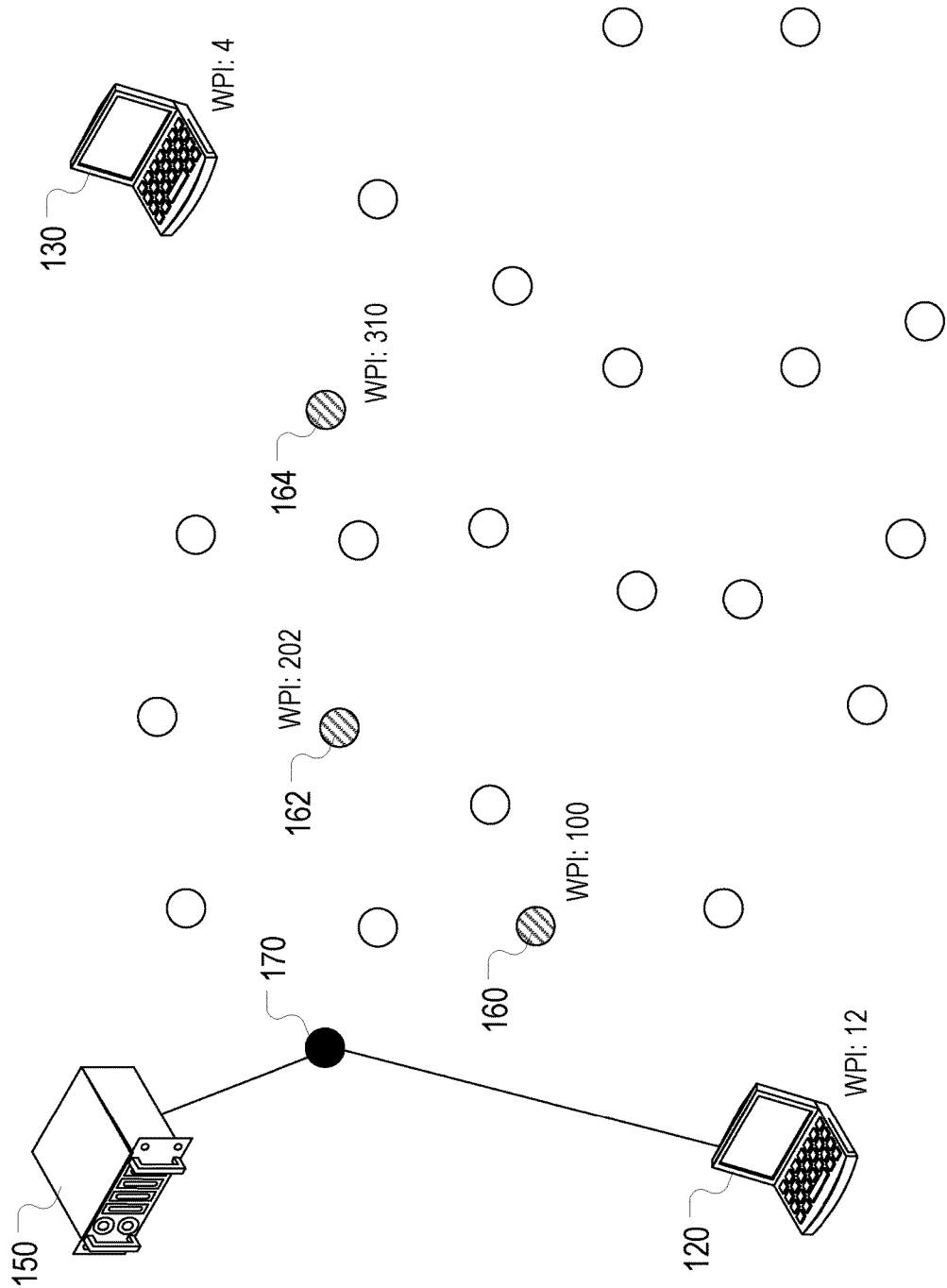
FIG. 4 illustrates communication of connection information over a control plane.

The first end device 120 communicates a request to communicate with the second end device 130 to the orchestrator 150. The orchestrator 150 communicates, over the control plane, e.g. utilizing one or more CallP deflects 170, connection information to set up a connection between the first end device 120 and the second end device 130, as illustrated in FIG. 4. This may include communication of an identification of a deflect to utilize for a connection.

The first end device 120 communicates a packet comprising a control portion (e.g. a packet header) over a network for communication to the second end device 130 via one or more intermediate nodes, including one or more data deflects.

Communications can be set up to utilize a single deflect, or multiple deflects.

In an exemplary implementation involving a single deflect, a control portion of a packet includes an indication of a destination address for the packet, and a waypoint identifier for the ultimate destination of the packet. More generally, a control portion of a packet, such as a data packet or a control packet, can include authentication data, a messaging version, a source client waypoint identifier, a destination client waypoint identifier, a next hop waypoint identifier, a source session identifier, a destination session identifier, a channel identifier, a connection identifier, a length, and command specific data (e.g., a packet number for a data packet or frame). The control portion may also include a route identifier, as described hereinbelow. The control portion may also include some reserved fields, flag fields, and tracing fields. A control portion may include, as it normally would, an indication of source and destination MAC addresses for layer 2, an indication of source and destination IP addresses for layer 3, and an indication of source and destination ports.

Figure 5:
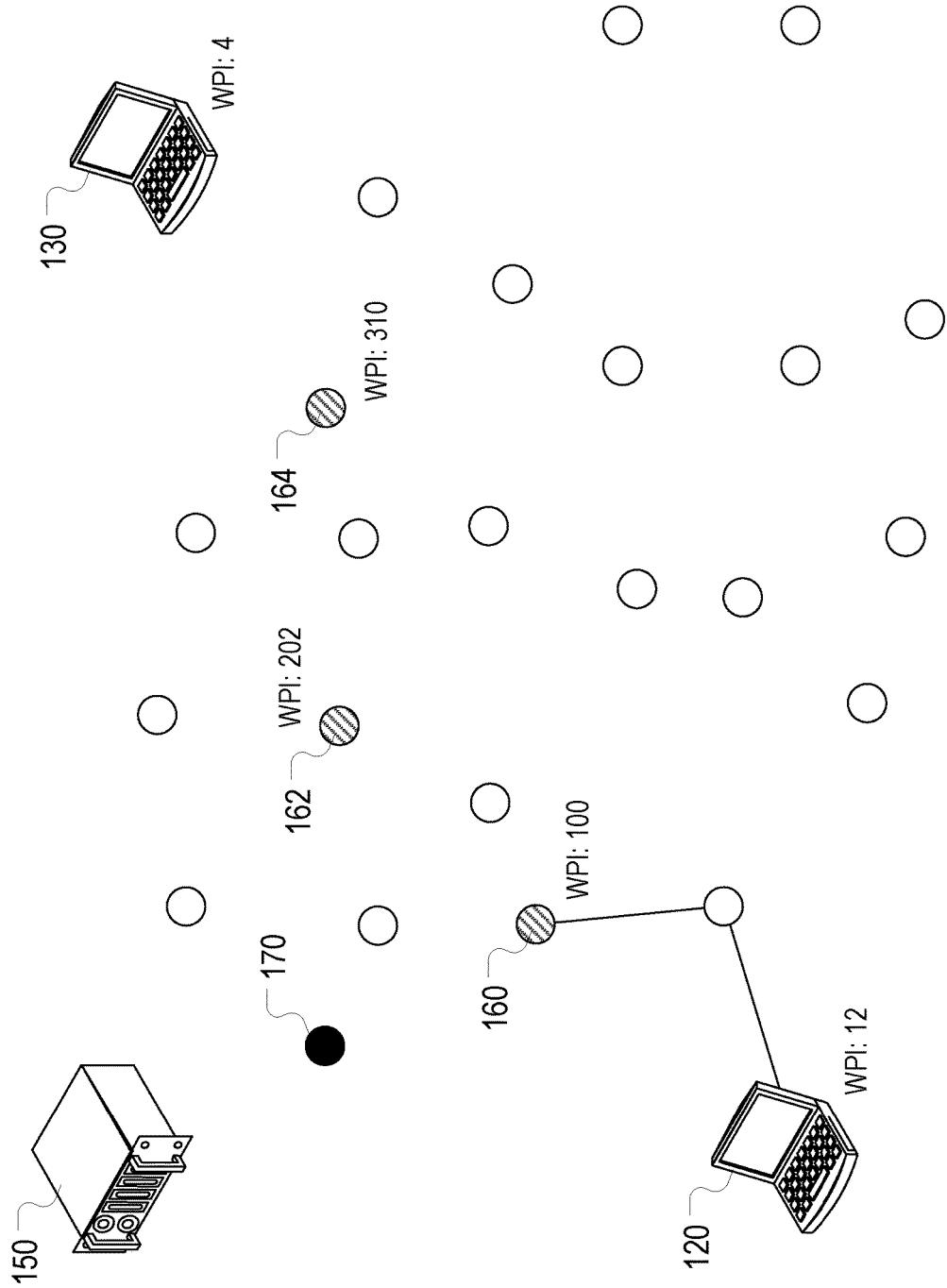
FIG. 5 illustrates communication of a packet from a first end device to a deflect.

The first end device 120 can, based on control information received from the orchestrator 150 via the control plane, set the destination IP address (and/or destination MAC address) in the control portion of the packet to the IP address of a deflect, such as deflect 160, and set the destination waypoint identifier for the ultimate destination to the waypoint identifier of the second end device 130. The packet is then communicated from the first end device 120 to the deflect 160 over one or more underlying networks, as illustrated in FIG. 5.

At the deflect 160, the packet, the control portion, or a portion thereof may be decrypted, and the deflect may access the destination waypoint identifier contained therein. The deflect 160 looks up, in a maintained table, an IP address associated with the destination waypoint identifier. This table may be populated based on control information received from the orchestrator over the control plane, or based on network knowledge gleaned from packets received from the second end device 130, e.g. control packets representing a ping received from the second end device 130 as part of setting up the connection. This table may form part of a routing table, or may be utilized in conjunction with a routing table which identifies a next node to forward the packet to in order to reach the second end device 130.

Figure 6:
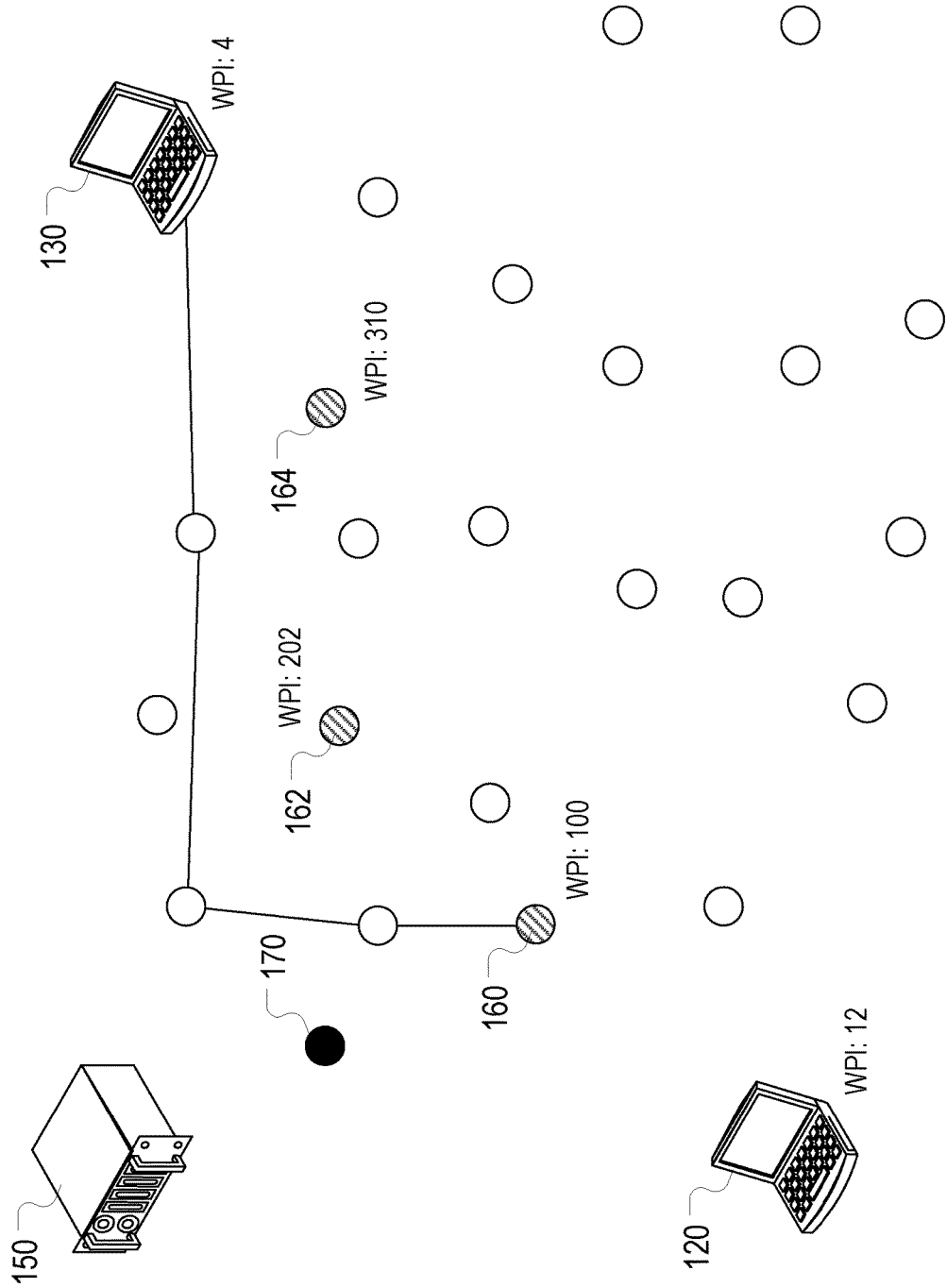
FIG. 6 illustrates routing of a packet onward to a second end device.

The deflect 160 sets the destination IP address to the looked-up IP address associated with the second end device 130, and forwards the packet onward based on its routing table. The packet is then routed onward to the second end device 130, as illustrated in FIG. 6.

This process involves use of a single deflect, and can be characterized as a single-hop deflection process.

A multi-hop deflection process, which involves the use of multiple deflects, can also be utilized. In an exemplary such implementation, route identifiers are utilized to identify a route from an originating node to a terminating node through multiple deflects.

Figure 7:
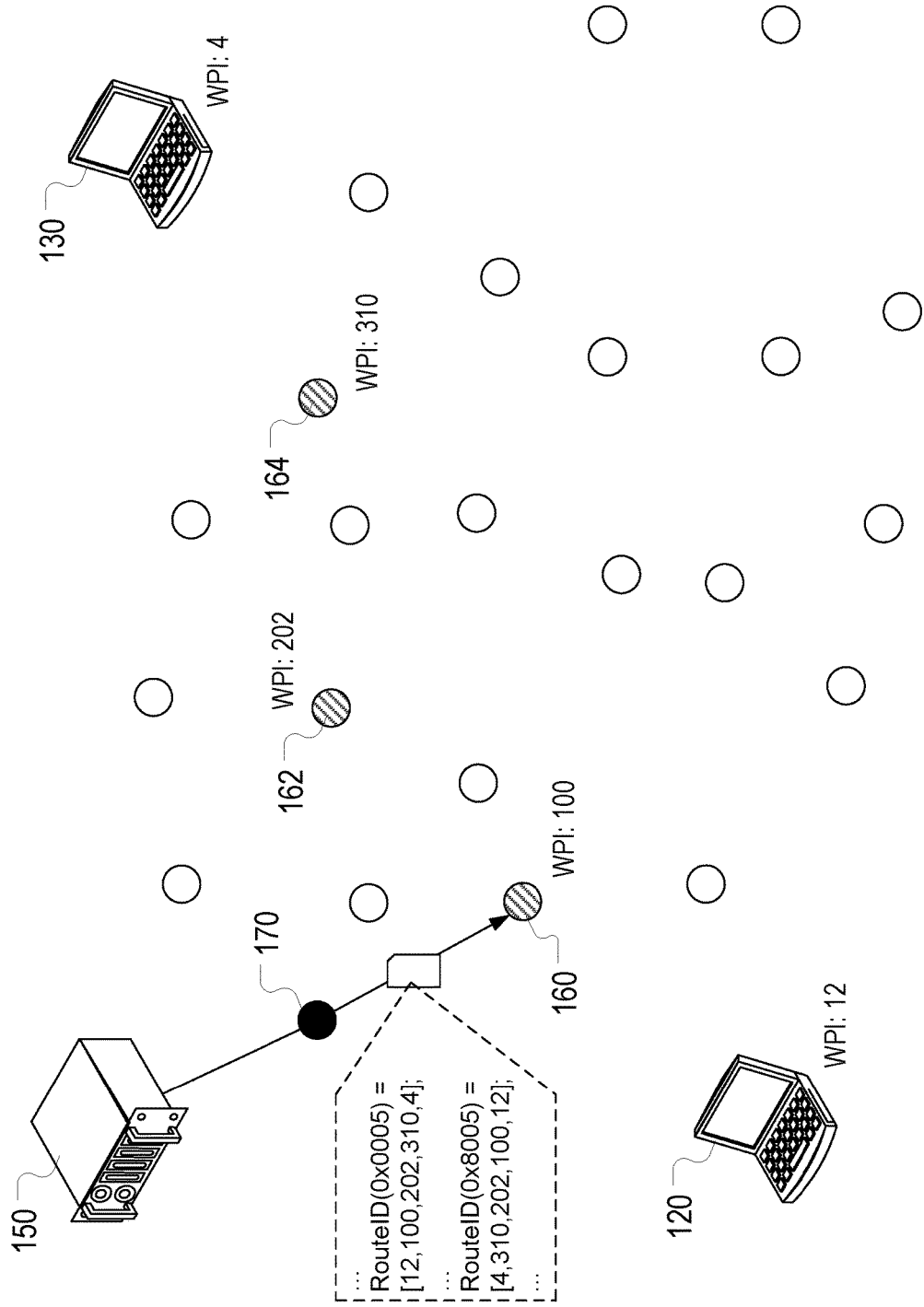
FIG. 7 illustrates communication of control information comprising route information from an orchestrator to a data deflect via a CallP deflect.

Returning to the previous example, the orchestrator 150 could provide, over the control plane, route information to the data deflects 160, 162, 164 that indicates a route from the first end device 120 to the second end device 130 through the data deflects 160, 162, 164, and further indicates a route identifier for the route, in this case 5. The route identifier may include a bit which specifies a direction for the route, e.g. 0x0005 may be a first direction, and 0x8005 may be a second, opposite direction. This route information, as well as other control information, may be communicated to the data deflects 160, 162, 164 from the orchestrator 150 directly, or may be communicated via use of one or more CallP deflects. For example, FIG. 7 illustrates exemplary communication of control information comprising route information from the orchestrator 150 to the data deflect 160 via a CallP deflect 170.

In setting up a connection from the first end device 120 to the second end device 130, the orchestrator 150 provides control information to the end devices 120,130 which may include a route identifier, e.g. a route identifier of 0x0005 may be provided to the first end device 120, and a route identifier of 0x8005 may be provided to the second end device 130. This control information may be may be communicated to the end devices 120, 130 from the orchestrator 150 directly, or may be communicated via use of one or more CallP deflects.

Figure 8:
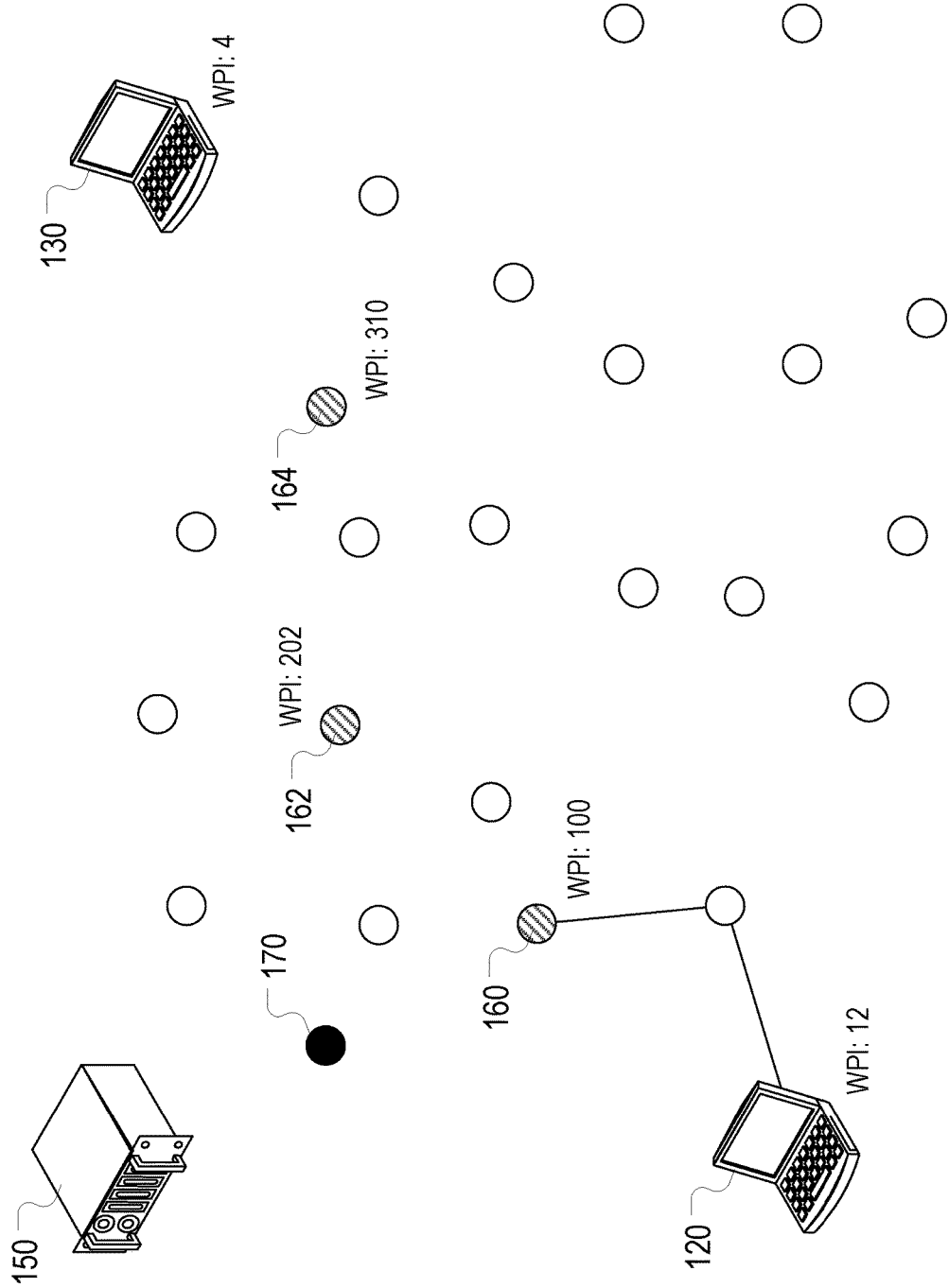
FIG. 8 illustrates communication of a packet from a first end device to a deflect.

The first end device 120 can, based on control information received from the orchestrator 150 via the control plane, set the destination IP address (and/or destination MAC address) in the control portion of the packet to the IP address of a deflect, such as deflect 160, set the destination waypoint identifier for the ultimate destination to the waypoint identifier of the second end device 130, and set the route identifier to the route identifier provided by the orchestrator 150, e.g. 0x0005. The first end device 120 may also set the next hop to the waypoint identifier of 310 corresponding to the deflect 160. The packet is then communicated from the first end device 120 to the deflect 160 over one or more underlying networks, as illustrated in FIG. 8.

Figure 9:
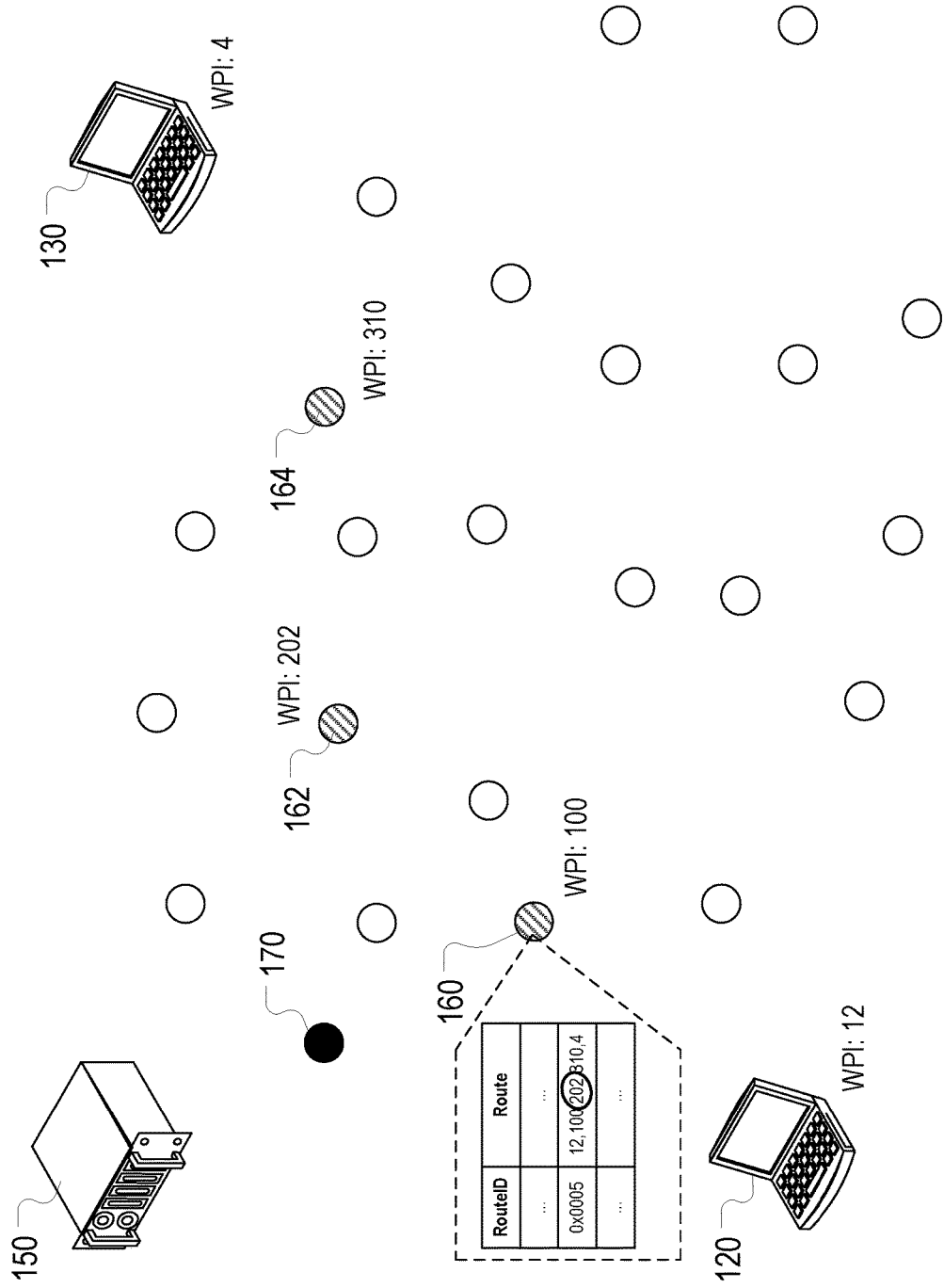
FIG. 9 illustrates lookup of a waypoint identifier for a next hop based on a route identifier.

At the deflect 160, the packet, the control portion, or a portion thereof may be decrypted, and the deflect may access the route identifier contained therein. The deflect 160 looks up, based on the route identifier, the waypoint identifier for the next hop along the route, which in this case would be the waypoint identifier of 202, as illustrated in FIG. 9. This waypoint identifier of 202 corresponds to the data deflect 162. The deflect 160 looks up, in a maintained table, an IP address associated with the next hop waypoint identifier of 202. This table may be populated based on control information received from the orchestrator over the control plane, or based on network knowledge gleaned from packets received from the corresponding node, e.g. control packets representing a ping received as part of setting up a connection. This table may form part of a routing table, or may be utilized in conjunction with a routing table which identifies a next node to forward the packet to in order to reach the deflect 162 corresponding to the waypoint identifier of 202 that was indicated to be the next hop in the route.

Figure 10:
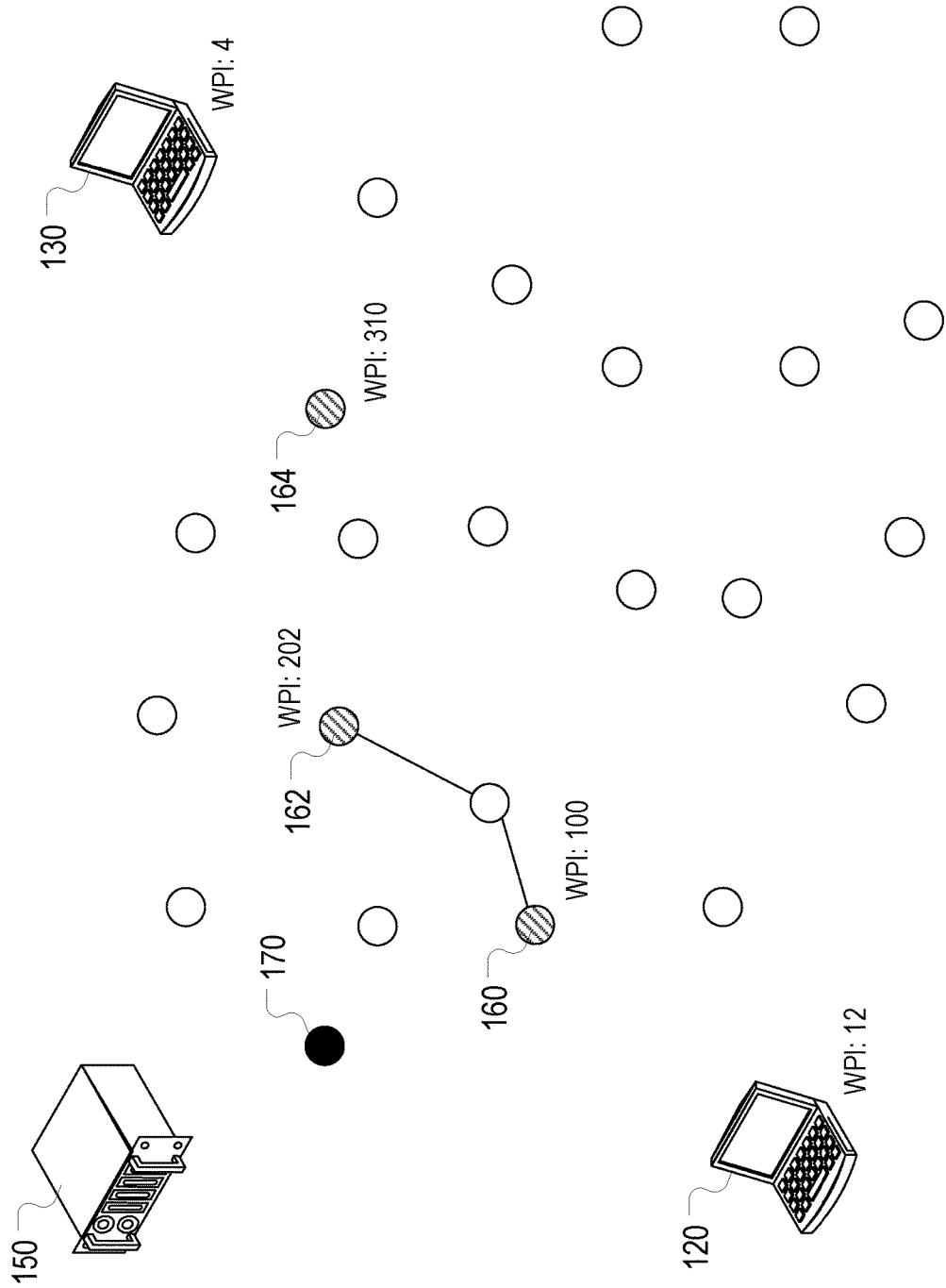
FIG. 10 illustrates routing of a packet onward to a deflect.

The deflect 160 sets the destination IP address to the looked-up IP address associated with the deflect 162, and forwards the packet onward based on its routing table. The deflect 160 may also set the next hop to the waypoint identifier of 202 corresponding to the deflect 162, but in at least some preferred implementations may not do so (e.g. to avoid having to generate a new hash). The packet is then routed onward to the deflect 162, as illustrated in FIG. 10.

At the deflect 162, the packet, the control portion, or a portion thereof may be decrypted, and the deflect may access the route identifier contained therein. The deflect 162 looks up, based on the route identifier, the waypoint identifier for the next hop along the route, which in this case would be the waypoint identifier of 100. This waypoint identifier of 100 corresponds to the data deflect 164. The deflect 162 looks up, in a maintained table, an IP address associated with the next hop waypoint identifier of 100. This table may be populated based on control information received from the orchestrator over the control plane, or based on network knowledge gleaned from packets received from the corresponding node, e.g. control packets representing a ping received as part of setting up a connection. This table may form part of a routing table, or may be utilized in conjunction with a routing table which identifies a next node to forward the packet to in order to reach the deflect 164 corresponding to the waypoint identifier of 100 that was indicated to be the next hop in the route.

Figure 11:
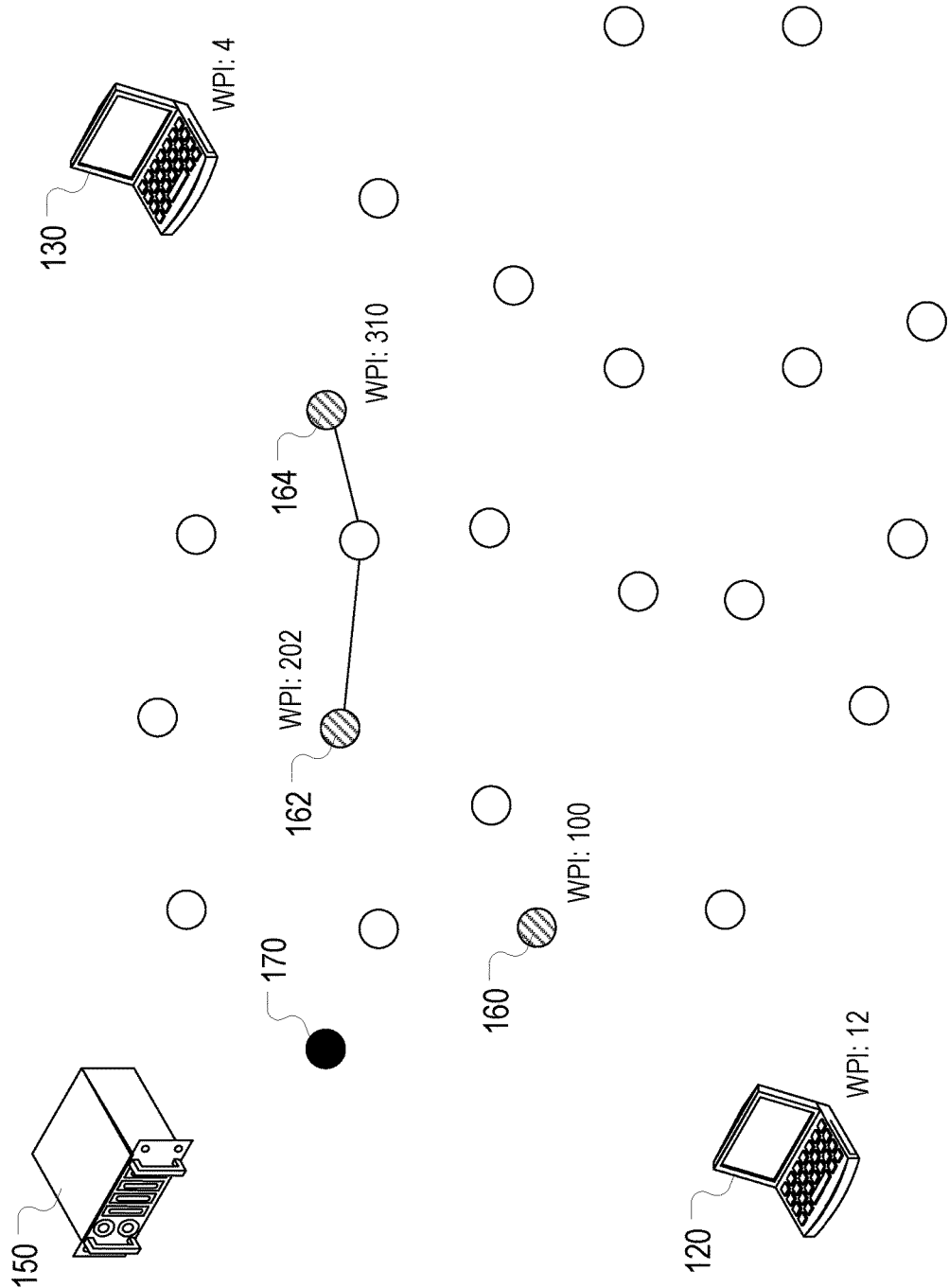
FIG. 11 illustrates routing of a packet onward to a deflect.

The deflect 162 sets the destination IP address to the looked-up IP address associated with the deflect 164, and forwards the packet onward based on its routing table. The deflect 162 may also set the next hop to the waypoint identifier of 100 corresponding to the deflect 162, but in at least some preferred implementations may not do so. The packet is then routed onward to the deflect 164, as illustrated in FIG. 11.

At the deflect 164, the packet, the control portion, or a portion thereof may be decrypted, and the deflect may access the route identifier contained therein. The deflect 164 looks up, based on the route identifier, the waypoint identifier for the next hop along the route, which in this case would be the waypoint identifier of 4. This waypoint identifier of 5 corresponds to the second end device 130. The deflect 164 looks up, in a maintained table, an IP address associated with the next hop waypoint identifier of 4. This table may be populated based on control information received from the orchestrator over the control plane, or based on network knowledge gleaned from packets received from the corresponding node, e.g. control packets representing a ping received as part of setting up a connection. This table may form part of a routing table, or may be utilized in conjunction with a routing table which identifies a next node to forward the packet to in order to reach the second end device 130 corresponding to the waypoint identifier of 4 that was indicated to be the next hop in the route.

Figure 12:
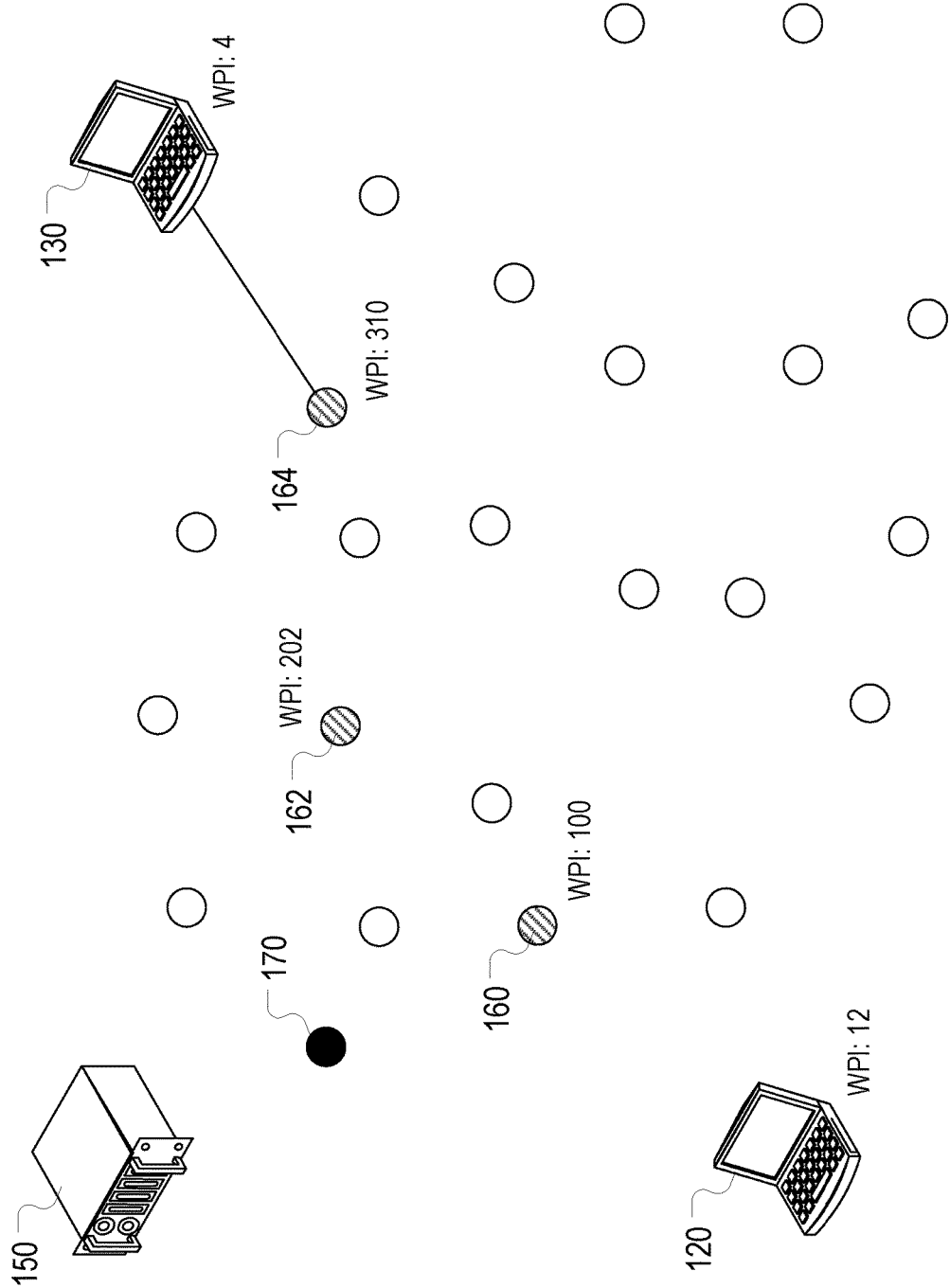
FIG. 12 illustrates routing of a packet onward to a second end device.

The deflect 164 sets the destination IP address to the looked-up IP address associated with the second end device 130, and forwards the packet onward based on its routing table. The deflect 164 may also set the next hop to the waypoint identifier of 4 corresponding to the second end device 130, but in at least some preferred implementations may not do so. The packet is then routed onward to the second end device 130, as illustrated in FIG. 12.

Approaches such as these involve use of the data plan to tunnel, encapsulate, or otherwise transport user data from a first endpoint node to a second endpoint node. These endpoint nodes may be user devices such as a phone, tablet, or laptop computer, may be servers connecting two or more locations or connecting a single user to a service, may be IoT devices, or may be virtual devices on a virtual machine or in a container. A node may comprise a virtual network function (VNF) within a network functions virtualization infrastructure (NFVI) (e.g. running on virtual customer premise equipment (vCPE)) with or without service function chaining (SFC). A node may comprise a Docker container, a Kubernetes container, or a Snap container. A node may be running, for example, Linux (non STIG), Red Hat STIG, Windows, a Mac OS, Android, iOS, or a Blackberry OS.

In accordance with one or more preferred implementations, one or more end devices having dispersive virtual networking software in the form of a virtual thin client (VTC) loaded thereon.

In accordance with one or more preferred implementations, an overlay network in the form of a dispersive virtual network is implemented utilizing data deflects to implement and facilitate routing in a data plane and CallP deflects to implement and facilitate routing in a control plane. Various nodes in the dispersive virtual network, such as end devices running dispersive virtual networking client software, establish communication channels to these deflects running dispersive virtual networking protocols transported by user datagram protocol (UDP) frames, transmission control protocol (TCP) streams, and hypertext transfer protocol (HTTP) streams.

Each transport mechanism has advantages and disadvantages. UDP, for example, is the most efficient mechanism of communication, but UDP may be blocked by an access point. TCP is the next most efficient, but it may also be blocked. HTTP is the least efficient, however, it is typically available everywhere, even on highly restricted guest networks.

Public access points, which include but are not limited to: LTE, 3G, 4G, 5G, and public WiFi, may place constraints on the traffic that is allowed to traverse the network. WiFi at a hotel, at a coffee shop, on an airline, or on a train may restrict UDP. A company IT department may only allow HTTP traffic to well known ports such as port 80 or 8080 to egress the IT perimeter. A public or guest WiFi may have captive portal logic as well.

In accordance with one or more preferred implementations, dispersive virtual network software allows nodes in a dispersive virtual network to automatically detect the channel types that are available at the time the node must initiate a new session.

In accordance with one or more preferred implementations, dispersive virtual network software allows nodes in a dispersive virtual network to automatically configure the most efficient communication channel without requiring input from an end user or from a network administrator.

In accordance with one or more preferred implementations, a dispersive virtual network comprises a plurality of CallP deflects with auto-detection functionality. In accordance with one or more preferred implementations, CallP deflects will initiate interface points on one or more provisioned ports using both TCP and UDP protocols. In accordance with one or more preferred implementations, on a TCP entry point, a CallP deflect will auto-detect and support both plain messaging and HTTP encapsulated.

In accordance with one or more preferred implementations, a virtual thin client at an end node will attempt to establish CallP peering with a CallP deflect utilizing UDP. If this is unsuccessful, the virtual thin client will attempt a TCP connection with the CallP deflect. If the TCP connection is successful, a PING exchange will proceed. If the PING exchange fails, then HTTP wrapping is attempted.

Figure 13:
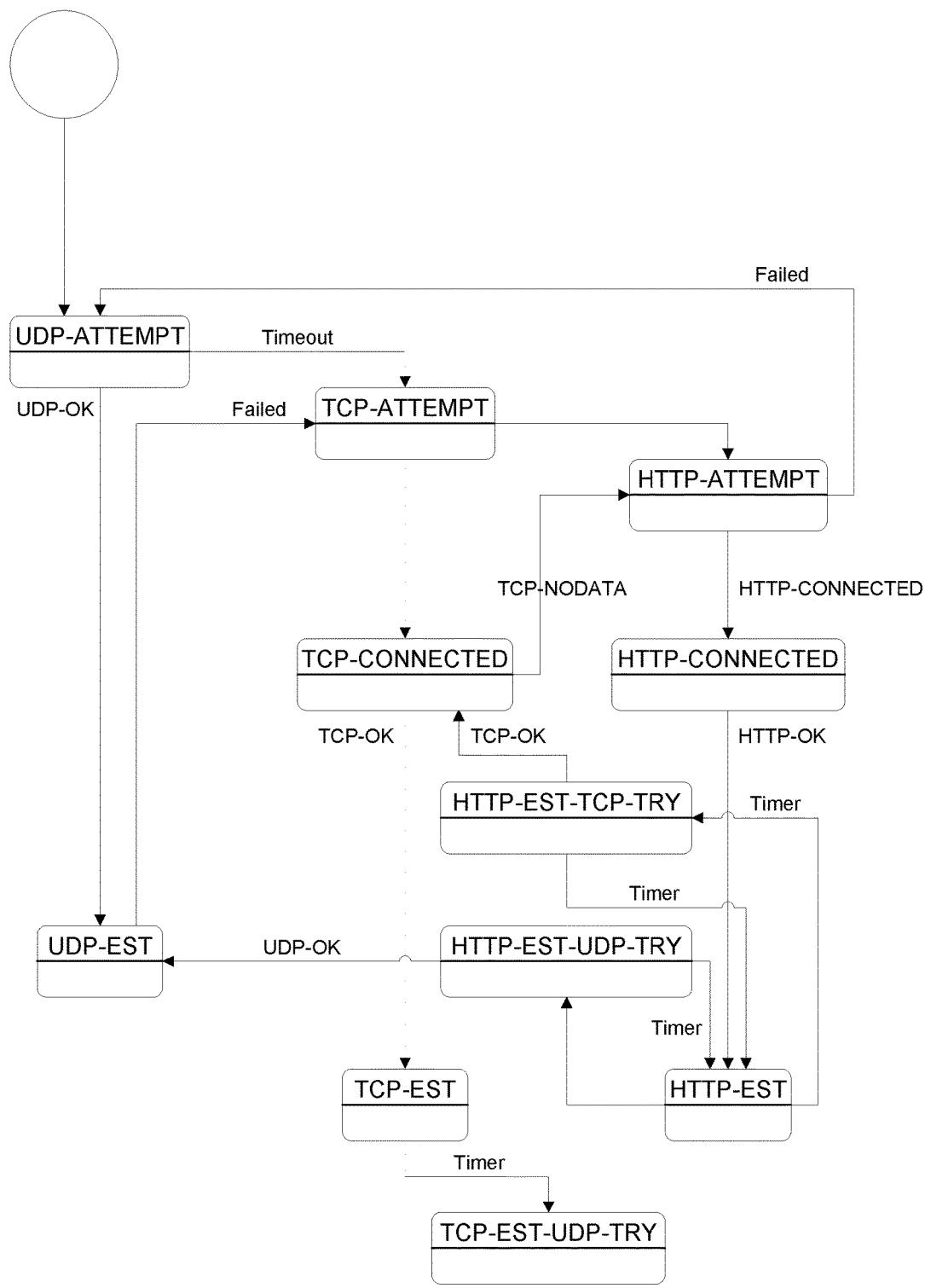
FIG. 13 illustrates a conceptual simple state machine representing exemplary CallP processing in accordance with one or more preferred implementations.

FIG. 13 illustrates a conceptual simple state machine representing exemplary CallP processing in accordance with one or more preferred implementations. FIG. 14 illustrates exemplary major states of CallP processing in accordance with one or more preferred implementations.

In accordance with one or more preferred implementations, once a particular communication channel is established, an attempt may be made, immediately and/or periodically thereafter, to establish a more preferred communication channel. For example, after a TCP communication channel is established, an attempt may thereafter periodically be made to establish a UDP communication channel.

It will be appreciated that CallP deflects may be utilized for communications over the control plane with nodes other than end nodes. In accordance with one or more preferred implementations, a similar methodology may be utilized for establishing a communication channel between two CallP deflects, or between a CallP deflect and a data deflect. In accordance with one or more preferred implementations, dispersive virtual networking software, e.g. a software client, at a CallP deflect or a data deflect is configured to provide for automatic channel selection.

In accordance with one or more preferred implementations, a dispersive virtual network comprises a plurality of data deflects that, similar the discussion above with respect to CallP deflects, support automatic protocol or channel selection, and can connect to a virtual thin client using UDP, TCP, or HTTP. In accordance with one or more preferred implementations, implementation of automatic protocol or channel selection differs in a data plane context, as there is high value in quick connection initiation as it affects end to end traffic availability and is noticeable to an end user.

In accordance with one or more preferred implementations, a virtual thin client (e.g. a virtual thin client at an end node) will evaluate the quality of UDP traffic to the Internet and if it is of sufficient quality (e.g. above a certain threshold), use UDP as an initial protocol for data deflect peering (e.g. establishing a communication channel with a data deflect). In accordance with one or more preferred implementations, a virtual thin client (e.g. a virtual thin client at an end node) will evaluate the quality of TCP traffic to the Internet and if it is of sufficient quality (e.g. above a certain threshold), use TCP as an initial protocol for data deflect peering (e.g. establishing a communication channel with a data deflect). In accordance with one or more preferred implementations, a virtual thin client (e.g. a virtual thin client at an end node) will evaluate the quality of HTTP traffic to the Internet and if it is of sufficient quality (e.g. above a certain threshold), use HTTP as initial protocol for data deflect peering (e.g. establishing a communication channel with a data deflect). In accordance with one or more preferred implementations, a virtual thin client will preferably use UDP if it is of sufficient quality, use TCP if UDP is not of sufficient quality but TCP is, and use HTTP if neither UDP nor TCP is of sufficient quality but HTTP is. In accordance with one or more preferred implementations, a virtual thin client may evaluate two or more different types of potential channels and select one based on compared channel quality.

Figure 15:
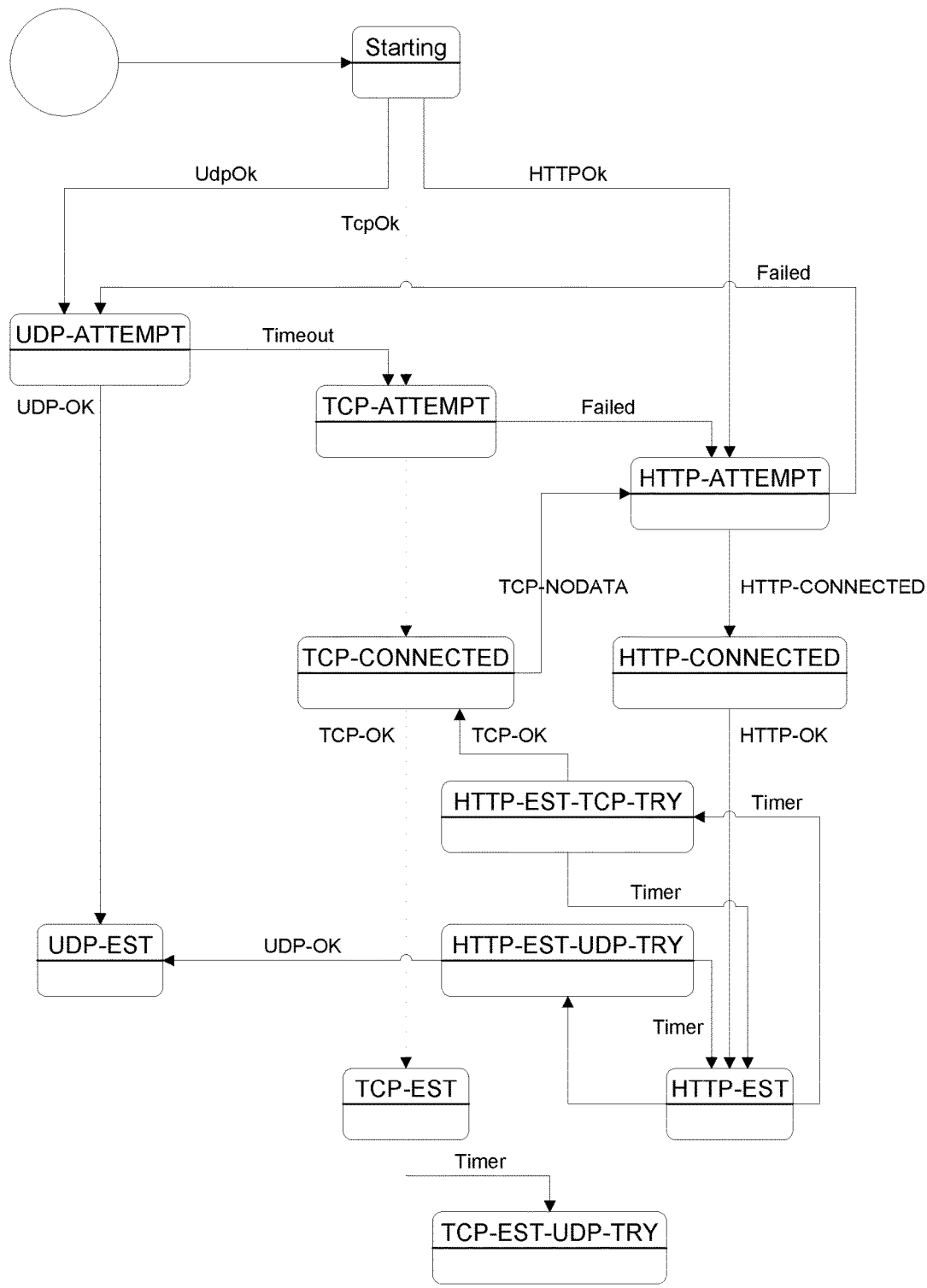
FIG. 15 illustrates a conceptual simple state machine representing exemplary data deflect peering processing in accordance with one or more preferred implementations.

FIG. 15 illustrates a conceptual simple state machine representing exemplary data deflect peering processing in accordance with one or more preferred implementations.

In accordance with one or more preferred implementations, an attempt to initiate data deflect peering is started during session initiation.

In accordance with one or more preferred implementations, once a particular communication channel is established, an attempt may be made, immediately and/or periodically thereafter, to establish a more preferred communication channel. For example, after a TCP communication channel is established, an attempt may thereafter periodically be made to establish a UDP communication channel.

It will be appreciated that data deflects may be in communication with nodes other than end nodes. In accordance with one or more preferred implementations, a similar methodology may be utilized for establishing a communication channel between two data deflects, or between a data deflect and a CallP deflect. In accordance with one or more preferred implementations, dispersive virtual networking software, e.g. a software client, at a data deflect or a CallP deflect is configured to provide for automatic channel selection.

In accordance with one or more preferred implementations, dispersive virtual networking software at an end device (e.g. a virtual thin client) is configured to automatically detect the channel types that are available at the time the end device must initiate a new session. In accordance with one or more preferred implementations, the end device will select the best possible channel type (even in the presence of a captive portal) without requiring network administrator or end user input.

In accordance with one or more preferred implementations, dispersive virtual networking software at an end device may be configured to vary connection methodologies, or utilize a specific connection methodology, based on a device type or operating system type. For example, in accordance with one or more preferred implementations, software configured for use on iOS devices is configured to prioritize and/or first attempt a TCP connection.

As described above, in accordance with one or more preferred implementations, software is configured to utilize HTTP communication channels. It will be appreciated that HTTP traffic (e.g. GET/POST) is unidirectional in terms of user data. In accordance with one or more preferred implementations, dispersive virtual networking software is configured to create two HTTP communication channels to achieve bi-directional data transmission.

In accordance with one or more preferred implementations, dispersive virtual networking software at an end device creates an HTTP GET channel to receive traffic, and an HTTP POST channel to send traffic (relative to the end device).

It will be appreciated, however, that GET and POST have a Content-Length and that length generally cannot be exceeded, because if it is, then an HTTP proxy may not allow the connection to proceed.

In accordance with one or more preferred implementations, to overcome the constraints imposed by such a Content-Length, dispersive virtual networking software is configured to continually "roll" the HTTP channels as the maximum Content-Length is reached. In accordance with one or more preferred implementations, this means that as communications occur, new HTTP channels are brought up and old ones are torn down.

In accordance with one or more preferred implementations, to make this more efficient, dispersive virtual networking software creates "current" and "next" HTTP channels. In accordance with one or more preferred implementations, dispersive virtual networking software, e.g. dispersive virtual networking software at an end device, is configured to create four HTTP channels, including a current GET channel, a current POST channel, a next GET channel, and a next POST channel. This allows the dispersive virtual networking software to immediately start using the appropriate "next" channel when Content-Length is reached on the "current" channel. At that time, the "next" channel becomes "current", and the dispersive virtual networking software then creates a new "next" channel.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for network communications utilizing an overlay network in which nodes are configured to automatically select an optimized communication channel, the method comprising:
    (a) establishing, by overlay client software loaded on an end device, a communication channel with a call processing deflect of the overlay network utilizing a first process for automatically selecting a communication channel, the first process for automatically selecting a communication channel being utilized and configured based on a device type of the end device;
    (b) providing, by a control server of the overlay network, connection information for establishing a connection between the end device and another end device by communicating control information to the two end devices via the call processing deflect, including via the established communication channel with the call processing deflect;
    (c) establishing, by the overlay client software loaded on the end device, a communication channel with a data deflect of the overlay network utilizing a second process for automatically selecting a communication channel for communications with the data deflect, the second process for automatically selecting a communication channel being utilized and configured based on a device type of the end device; and
    (d) communicating data from the end device to the other end device over a network path through the overlay network that includes the data deflect, such communicating data comprising communicating data utilizing the communication channel established with the data deflect.

2. The method of claim 1, wherein the first process comprises prioritizing a TCP connection.

3. The method of claim 1, wherein the end device comprises a mobile communication device.

4. The method of claim 1, wherein the end device comprises an iOS device.

5. The method of claim 1, wherein the end device comprises an iOS device, and the first process comprises prioritizing a TCP connection.

6. The method of claim 1, wherein the end device comprises an iOS device, the first process comprises prioritizing a TCP connection, and the second process comprises prioritizing a TCP connection.

7. The method of claim 1, wherein the communication channel with the data deflect comprises a first HTTP communication channel.

8. A method for network communications utilizing an overlay network in which nodes are configured to automatically select an optimized communication channel, the method comprising:
    (a) establishing, by overlay client software loaded on an end device, a communication channel with a call processing deflect of the overlay network utilizing a first process for automatically selecting a communication channel;
(b) providing, by a control server of the overlay network, connection information for establishing a connection between the end device and another end device by communicating control information to the two end devices via the call processing deflect, including via the established communication channel with the call processing deflect;
(c) establishing, by the overlay client software loaded on the end device, one or more communication channels with a data deflect of the overlay network utilizing a second process for automatically selecting a communication channel for communications with the data deflect, including
  (i) creating, by the overlay client software loaded on the end device, a first HTTP GET channel to receive traffic at the end device, and associating the first HTTP GET channel as a current HTTP GET channel,
  (ii) creating, by the overlay client software loaded on the end device, a first HTTP POST channel to send traffic from the end device, and associating the first HTTP POST channel as a current HTTP POST channel,
  (iii) creating, by the overlay client software loaded on the end device, a second HTTP GET channel to receive traffic at the end device, and associating the second HTTP GET channel as a next HTTP GET channel, and
  (iv) creating, by the overlay client software loaded on the end device, a second HTTP POST channel to send traffic from the end device, and associating the second HTTP POST channel as a next HTTP POST channel;
(d) communicating data from the end device to the other end device over a network path through the overlay network that includes the data deflect, such communicating data comprising
  (i) receiving data at the end device over the first HTTP GET channel which is associated as the current HTTP GET channel, and
  (ii) sending data from the end device over the first HTTP POST channel which is associated as the current HTTP POST channel;
(e) determining, at the end device, that a Content-Length has been reached on the first HTTP GET channel, and, based thereon,
  (i) determining, by the overlay client software loaded on the end device, that the second HTTP GET channel is associated as the next HTTP GET channel, and changing the association such that it is associated as the current HTTP GET channel, and
  (ii) creating, by the overlay client software loaded on the end device, a third HTTP GET channel to receive traffic at the end device, and associating the third HTTP GET channel as the next HTTP GET channel;
(f) communicating data from the end device to the other end device over a network path through the overlay network that includes the data deflect, such communicating data comprising
  (i) receiving data at the end device over the second HTTP GET channel which is associated as the current HTTP GET channel, and
  (ii) sending data from the end device over the first HTTP POST channel which is associated as the current HTTP POST channel;
(g) determining, at the end device, that a Content-Length has been reached on the first HTTP POST channel, and, based thereon,
  (i) determining, by the overlay client software loaded on the end device, that the second HTTP POST channel is associated as the next HTTP POST channel, and changing the association such that it is associated as the current HTTP POST channel, and
  (ii) creating, by the overlay client software loaded on the end device, a third HTTP POST channel to receive traffic at the end device, and associating the third HTTP POST channel as the next HTTP POST channel; and
(h) communicating data from the end device to the other end device over a network path through the overlay network that includes the data deflect, such communicating data comprising
  (i) receiving data at the end device over the second HTTP GET channel which is associated as the current HTTP GET channel, and
  (ii) sending data from the end device over the second HTTP POST channel which is associated as the current HTTP POST channel.

9. The method of claim 8, wherein the control server comprises one or more physical servers.

10. The method of claim 8, wherein one of the end devices is a phone.

11. The method of claim 8, wherein one of the end devices is a tablet.

12. The method of claim 8, wherein one of the end devices is a mobile electronic device.

13. The method of claim 8, wherein one of the end devices comprises a virtual machine.

14. The method of claim 8, wherein one of the end devices comprises a container.

15. The method of claim 8, wherein one of the end devices is a desktop computer.

16. The method of claim 8, wherein one of the end devices is a laptop computer.

17. A method for network communications utilizing an overlay network in which nodes are configured to automatically select an optimized communication channel, the method comprising:
(a) establishing, by overlay client software loaded on an end device, a communication channel with a call processing deflect of the overlay network utilizing a first process for automatically selecting a communication channel;
(b) providing, by a control server of the overlay network, connection information for establishing a connection between the end device and another end device by communicating control information to the two end devices via the call processing deflect, including via the established communication channel with the call processing deflect;
(c) establishing, by the overlay client software loaded on the end device, one or more communication channels with a data deflect of the overlay network utilizing a second process for automatically selecting a communication channel for communications with the data deflect, including
  (i) creating, by the overlay client software loaded on the end device, a current HTTP GET channel,
  (ii) creating, by the overlay client software loaded on the end device, a current HTTP POST channel,
  (iii) creating, by the overlay client software loaded on the end device, a next HTTP GET channel, and (iv) creating, by the overlay client software loaded on the end device, a next HTTP POST channel;

(d) communicating data from the end device to the other end device over a network path through the overlay network that includes the data deflect, such communicating data comprising (i) receiving data at the end device over the current HTTP GET channel, and (ii) sending data from the end device over the current HTTP POST channel; and (e) wherein the method involves, during the communicating of data from the end device to the other end device, repeatedly (i) determining, at the end device, that a Content-Length has been reached on the current HTTP GET channel, and, based thereon, (A) converting the next HTTP GET channel to be the current HTTP GET channel, and (B) creating, by the overlay client software loaded on the end device, a new HTTP GET channel to be the next HTTP GET channel, and (ii) determining, at the end device, that a Content-Length has been reached on the current HTTP POST channel, and, based thereon, (A) converting the next HTTP POST channel to be the current HTTP POST channel, and (B) creating, by the overlay client software loaded on the end device, a new HTTP POST channel to be the next HTTP POST channel.

\* \* \* \* \*